(12) United States Patent
Grossman

(10) Patent No.: US 7,815,337 B2
(45) Date of Patent: Oct. 19, 2010

(54) FLEXIBLE BATTERY CONTAINER AND METHOD OF USE

(76) Inventor: Victor A. Grossman, 91 Rupert Ave., Staten Island, NY (US) 10314

( * ) Notice: Subject to any disclaimer, the term of this patent is extended or adjusted under 35 U.S.C. 154(b) by 265 days.

(21) Appl. No.: 11/985,691

(22) Filed: Nov. 16, 2007

(65) Prior Publication Data

US 2009/0129069 A1    May 21, 2009

(51) Int. Cl.
*F21L 4/04* (2006.01)
(52) U.S. Cl. ..................... 362/189; 362/202
(58) Field of Classification Search .............. 362/189, 362/157, 183, 188, 190, 198, 200, 202, 208, 362/204, 205, 206; 439/500, 627
See application file for complete search history.

(56) References Cited

U.S. PATENT DOCUMENTS

| | | | | |
|---|---|---|---|---|
| 4,768,138 | A * | 8/1988 | Leopoldi et al. | ............ 362/189 |
| 5,385,500 | A * | 1/1995 | Schmidt | ....................... 446/73 |
| 6,109,761 | A * | 8/2000 | Smith et al. | ................. 362/108 |
| 6,296,368 | B1 | 10/2001 | Maglica | |
| 6,457,841 | B1 | 10/2002 | Lynch | |
| 6,480,051 | B2 | 11/2002 | Drapkin | |
| 6,536,912 | B2 | 3/2003 | Parker | |
| 6,568,829 | B2 | 5/2003 | Garrity | |
| 6,623,293 | B1 | 9/2003 | Wu | |
| 6,709,784 | B2 | 3/2004 | Resch | |
| 6,924,605 | B2 * | 8/2005 | Chun | ....................... 315/241 P |

\* cited by examiner

*Primary Examiner*—Bao Q Truong

(57) ABSTRACT

A flashlight apparatus including a body portion formed from a woven material, the body portion having a longitudinal length and forming at least part of an adjustable cavity for containing at least one battery, and a head portion coupled to the body portion and having at least one of an illumination source for providing illumination and a connector for connecting the flashlight to another device. Accordingly, the flashlight can supply power to the another device. The body portion can adjust (e.g., its length and diameter—or area) to the size and number of battery cells contained therein.

18 Claims, 18 Drawing Sheets

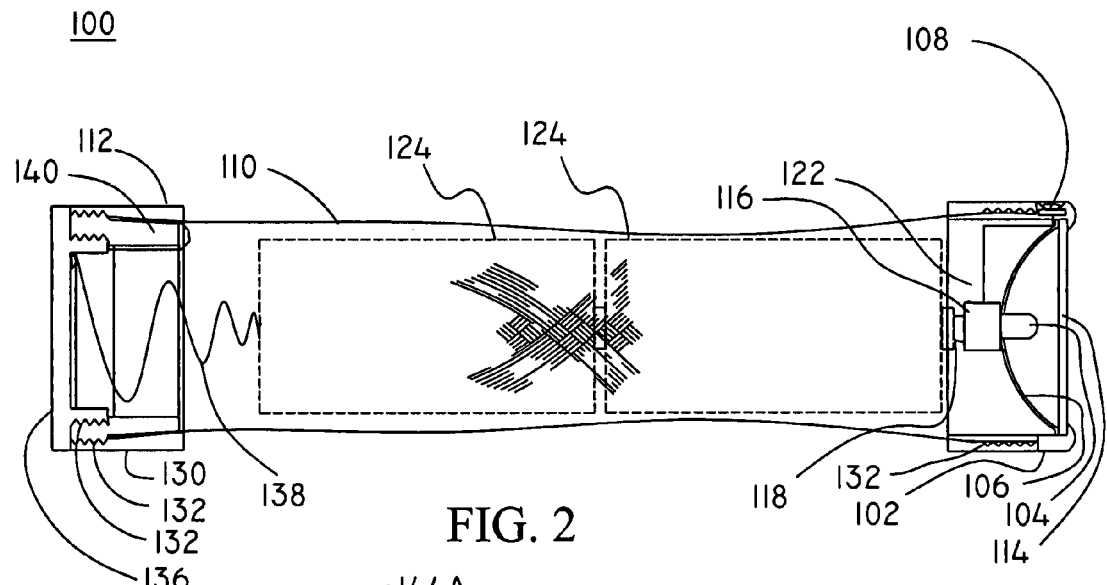
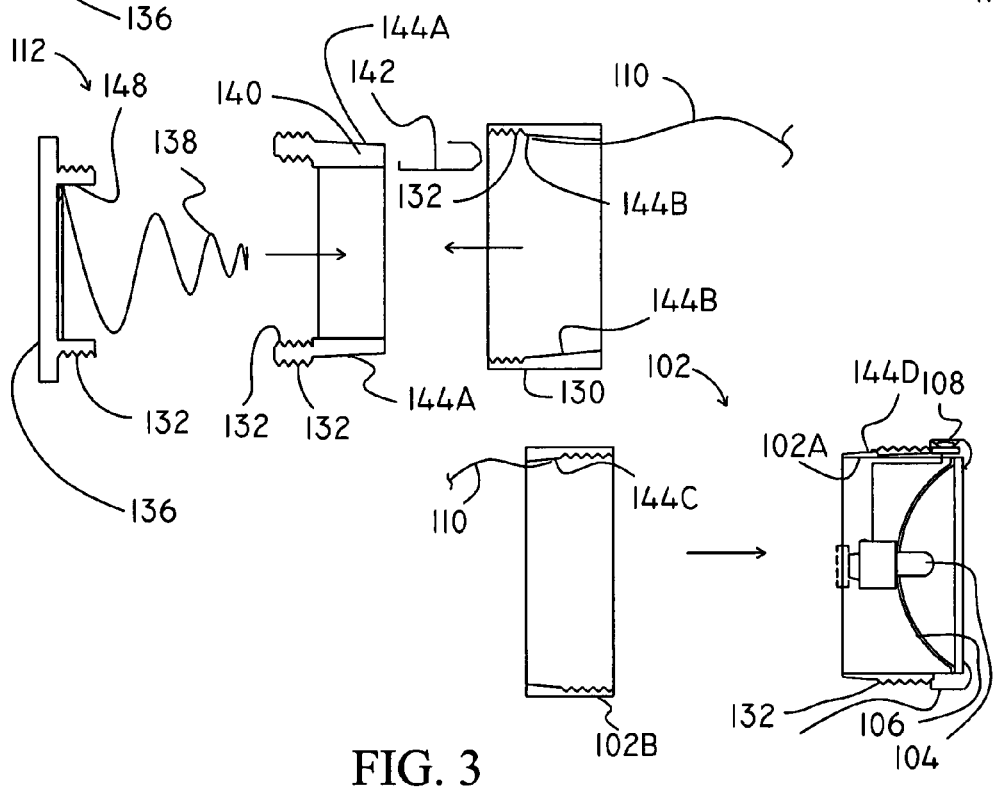

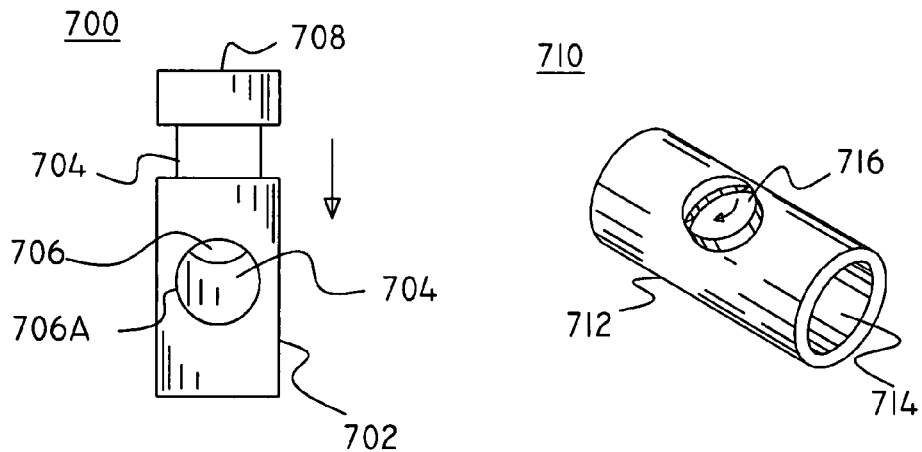
FIG. 7A
(PRIOR ART)
FIG. 7B
(PRIOR ART)
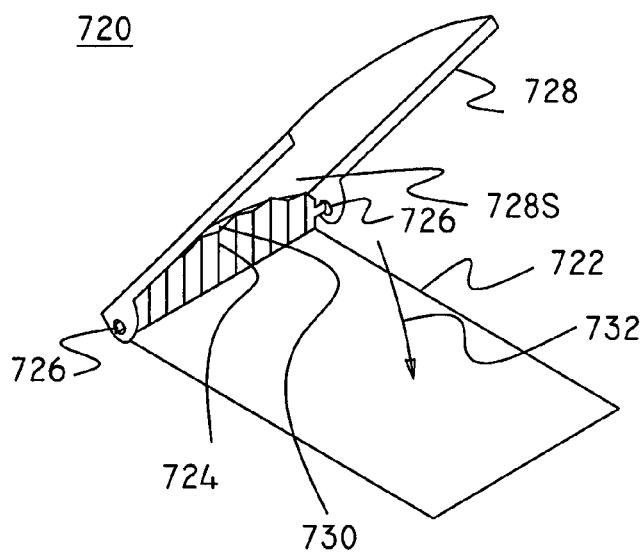
FIG. 7C
(PRIOR ART)

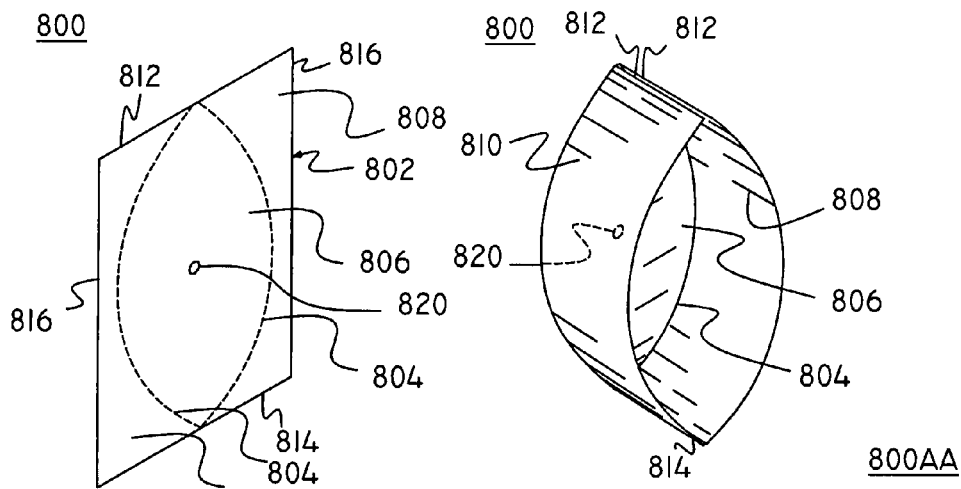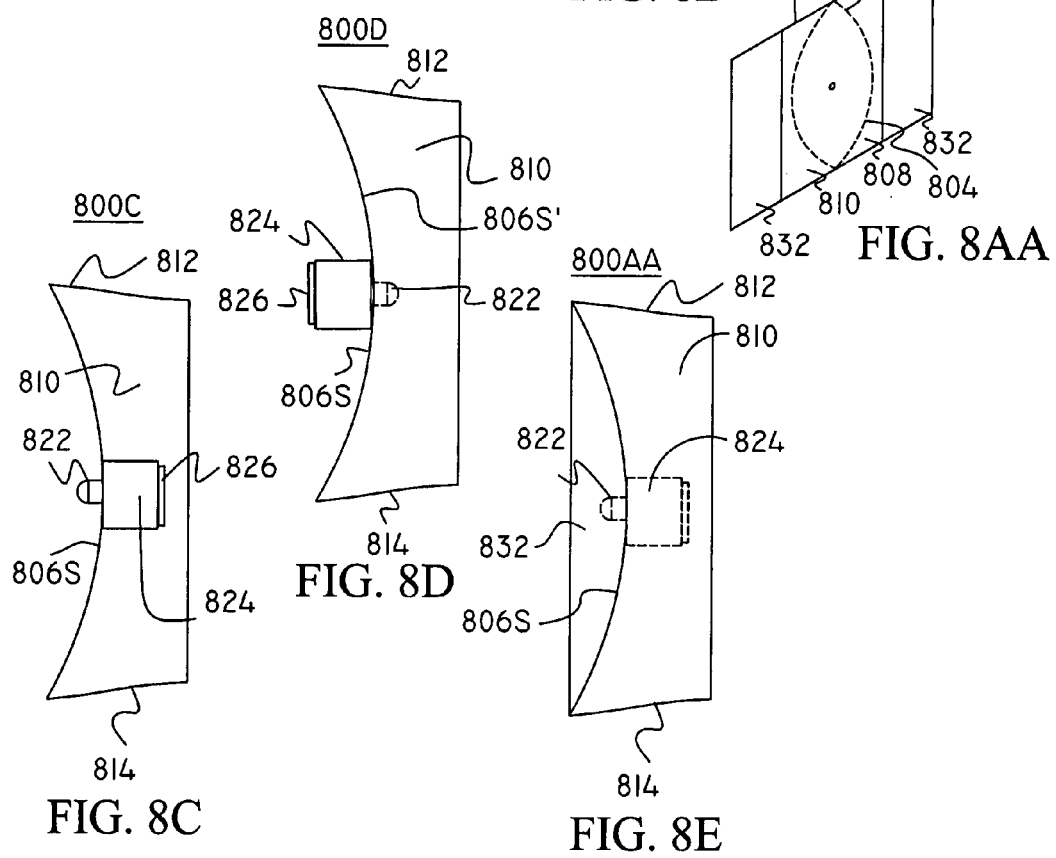
FIG. 8A
FIG. 8B
FIG. 8AA
FIG. 8C
FIG. 8D
FIG. 8E

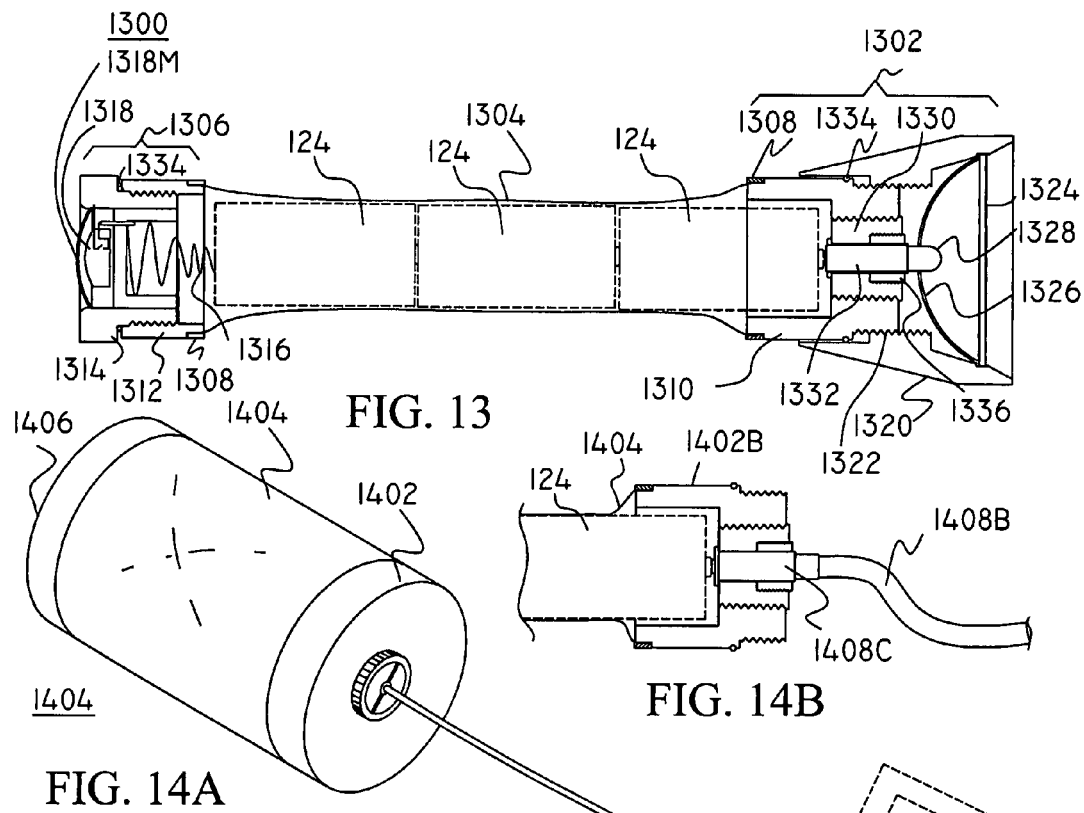
FIG. 13
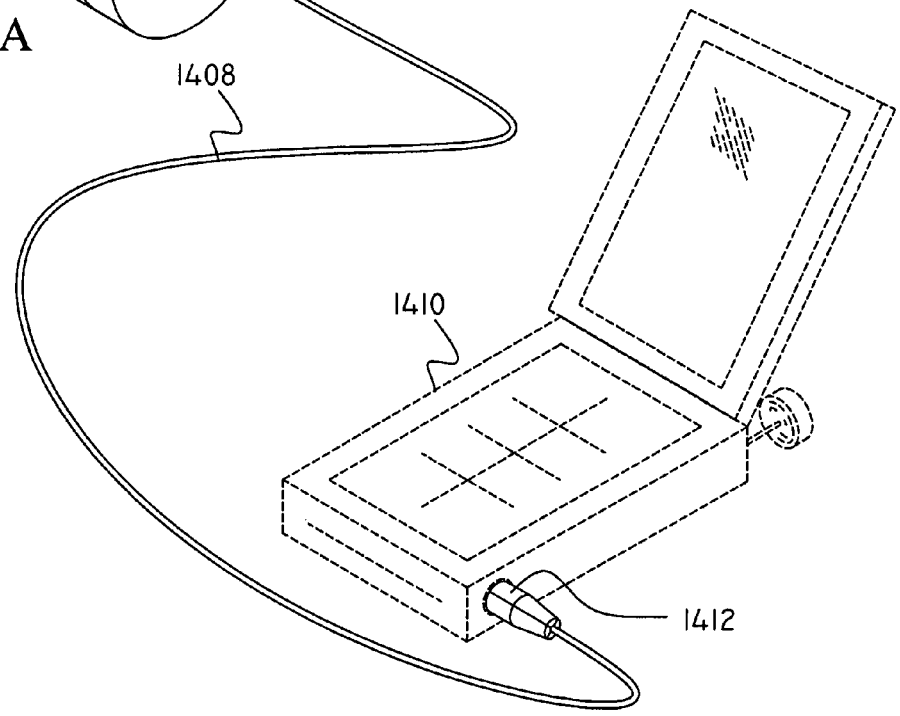
FIG. 14A
FIG. 14B

FLEXIBLE BATTERY CONTAINER AND METHOD OF USE

FIELD OF THE INVENTION

The present invention relates generally to a flexible body for accepting battery cells, and more particularly to a flexible body for a battery pack, a flashlight, or other devices, which can accept batteries of various numbers and types.

BACKGROUND OF THE INVENTION

With the recent progress of technology, mobile (i.e., portable) devices have become commonplace. However, these devices require a power supply. Typically, a user can determine when to charge or replace a battery to avoid the inconvenience of running low on batteries. For example, users of portable devices, such as mobile phones, typically charge their mobile phones when at home, work, etc., so that they do not inadvertently run low on power when using the devices in a mobile environment. To this effect, mobile devices typically include a battery power meter for indicating a charged state.

However, even with the most diligent attempts, portable devices may run low or out of battery power (i.e., become fully discharged) in which case there is need to either charge or replace their batteries at inconvenient locations or times. Thus, while a user may conventionally use a power outlet to power and/or charge these mobile devices (e.g., mobile phones), this may not be possible when outdoors, in an area that lacks a power supply, or during a power failure.

For example, people often rely on mobile battery-powered devices (e.g., flashlights, global positioning system (GPS) devices, short message service (SMS) messaging devices, cellular phones, or personal digital assistants (PDAs), etc.) when power fails. However, they do not check the batteries of these devices on a regular basis. Accordingly, during a power failure, or other emergency (e.g., a national disaster, terrorist attack, etc.) when, for example, flashlight use is typically required, a flashlight that is capable of supplying light may not be available because of discharged or run-down batteries. Further, during various emergencies, emergency messages may be transmitted using SMS messaging, etc. to certain classes. Accordingly, it is desirable to have an auxiliary portable power source which can provide emergency power to, for example, SMS messaging devices such as cellular telephones and PDAs.

In another example, soldiers stationed at remote locations typically use mobile devices for lighting, communication, data and target acquisition, scopes, night vision positioning and sensing devices, etc. Although soldiers typically carry expected gear such as these mobile devices (e.g., flashlights, communication devices, etc.) and supplies of fully-charged batteries on their person or have this gear supplied, this may not always be the case. For example, existing rigid-body mobile devices such as flashlights occupy a great deal of space and it may be difficult or impossible for soldiers to charge existing batteries or to obtain a required number and type of battery for these mobile devices when their batteries run low, are damaged, or become discharged. Accordingly, their lives and mission may be placed at risk because of the lack of battery power. For example, a soldier may rely upon a flashlight to provide necessary illumination, a communication terminal for communications, and a night-vision scope to target an enemy before the enemy targets him. However, with the lack of power, these devices would be rendered useless and the soldier's life may be placed at risk.

Likewise, emergency personnel and even regular civilians may also rely upon mobile devices and their batteries to provide many life-saving services or conveniences. For example, during a disaster (e.g., a terrorist attack, fire, etc.) a person may rely upon a flashlight to provide necessary illumination. However, if the flashlights batteries are discharged, the flashlight may not be capable of providing the necessary illumination. Accordingly, it is desirable to provide a flashlight that is compatible with a plurality of battery types and number of batteries. Moreover, it is also desirable to provide a flashlight that can be folded upon itself to conserve space. Further, it is an object of the present invention to provide a compact battery pack which is compatible with a plurality of battery types and numbers of batteries and that can power a plurality of electrical devices.

Typically, flashlights use one or more batteries, which are serially disposed in a cylindrical tube serving as a barrel or body, for power. An electrical circuit is established from a first electrode of the one or more batteries through a bulb (e.g., a filament, light emitting diode (LED), etc.) and back to a second electrode having an opposite polarity, thus forming an electrical circuit. A switch for interrupting the electrical circuit is typically disposed between the first and second electrodes. The cylindrical tube is typically formed from a rigid material.

Moreover, flashlights are typically used to provide an advertising medium. As such, it is desirable to provide a novelty item that is capable of providing an advertising medium.

Thus, there is a need for an easy-to-use battery-holding package that is capable of providing power to various devices such as mobile devices (e.g., flashlights, PDAs, cellular phones, GPS devices, photographic equipment, emergency strobes, beacons, etc.) and is compatible with various numbers and types of batteries and avoids the problems and disadvantages of prior art holders.

Additionally, there is a need for an easy-to-use flashlight that has a flexible body that can be folded and is suitable for use with various numbers and types of batteries and avoids the problems and disadvantages of conventional flashlights.

SUMMARY OF THE INVENTION

The present invention relates to a battery holder apparatus that is particularly suited for supplying power to mobile devices using various numbers and types of batteries.

It is an aspect of the present invention to provide a flashlight apparatus, including a head portion having at least one illumination source, and a body portion formed from a woven material and being coupled to the head portion, the body portion forming an adjustable cavity for containing at least one battery and including at least one conductive element (e.g., a strand, etc.) for conducting a current along a longitudinal length thereof to supply power to the illumination source. The adjustable cavity can be adjusted in at least one of diameter and length, wherein when the diameter of the adjustable cavity is adjusted the length is adjusted proportionally thereto. It should also be noted that the body portion of the present invention may be flattened and folded upon itself and/or may assume a non-circular shape. However, for the sake of clarity, it will be assumed that the diameter refers to an inner diameter of the body portion.

It is another aspect of the present invention to provide a flashlight apparatus that includes a switch for controlling the current and/or voltage supplied thereto dependent upon a type and number of batteries contained therein. The flashlight may include a conductive end part being in contact with and positioning at least one terminal of an adjacent battery of the at least one battery. The conductive part may be located in proximity to an end of the adjustable cavity that is opposite the head and/or tail parts. A controller may be used to adjust voltage and/or current supplied to the illumination source. The controller may also be responsive to a user's selection (e.g., via a switch, etc.), battery voltage, illumination source requirements, time (e.g., to cause the illumination source to pulse), etc., so as to control the voltage and/or current as desired or required.

An additional aspect of the present invention is to provide a novel device and method for displaying at least logos, text, graphics, etc. formed on the body portion thereof such that when the diameter and/or length of the body portion is changed, the aspect ratio (i.e., the ratio of the height to the width) of the logos, text, graphics, etc. also changes.

It is another aspect of the present invention to provide a flashlight apparatus, including a body part formed from a woven material for forming an adjustable cavity, the adjustable cavity being adjustable in diameter and/or length, such that a desired number of battery cells or battery cells having a different type can be located by the body part. The body part optionally conducts current from the battery cells. A head part is connected to the body part and includes one or more illumination sources for providing illumination. The size and/or shape of an inner cavity of the body portion can be changed so that batteries contained therein are held in a desired position. Further, a clamp may be provided to adjust the size and/or shape of the inner cavity. An optional length adjusting member may be used to locate a terminal of an adjacent battery in a desired position. An optional biasing element may be used to provide a biasing force against a terminal of an adjacent battery and/or the body part.

The body is formed from a woven material. The woven material is preferably formed from a polymer. The woven material may optionally include electrically conductive and/or optically conductive strands. The body may be optionally formed from a metal such as brass, aluminum, copper, or combinations thereof. An optical couple can be provided to optically couple the conductive strands to the illumination source and/or another illumination source. The illumination sources may include light-emitting diodes (LEDs), laser LEDs, incandescent bulbs, and fluorescent bulbs, electroluminescent (EL) elements, etc. The head portion may include a sheet of material such as a metallic or polymeric material, and/or may include one or more weakened lines. The head portion may include an LED.

It is a further aspect of the present invention to provide a controller for controlling the illumination source dependent upon a number and type of battery cells, and a switch for controlling the controller.

It is yet another aspect of the present invention to provide a battery pack for supplying power to or receiving power from a mobile device. The battery pack includes a body part formed from a woven material to form an adjustable cavity which can be adjusted in, for example, diameter and/or length, such that battery cells having a different type (or number) can be located by the body portion. The body part can include conductive strands for conducting current (voltage, etc.) from one or more batteries contained therein. A head part is attached to the body part and may receive current (or voltage) from the body part. The connecting part may be attached to the head part, (or in optional embodiments, the tail or body parts) and conduct electrical power to/from another device (e.g., a cellular telephone, a battery charger). The connector has an end suitable for supplying or receiving power from the other device and may include plug-in jacks, USB connector, etc., as required. The battery pack may include a plurality of woven body parts. The battery pack may also include means for controlling current and/or voltage dependent upon the number and type of the one or more batteries contained therein and/or the type of connection (e.g., serial or parallel). Accordingly, the battery pack according to the present invention may be compatible with various types of devices depending upon the connector used. The connector may include a flexible wire, etc.

It is yet a further aspect of the present invention to provide a method for using an adjustable cell-type flashlight apparatus, the method including forming an adjustable cavity by adjusting a body part formed from a woven material, the adjustable cavity being adjustable in both diameter and length, such that battery cells having a different type can be located by the body part, the body part conducting power (e.g., current and/or voltage from the battery cells), optionally adjusting, by a controller or a user, voltage and/or current received from the battery cells and supplied to an illumination source such that the illumination source does not burn out due to excessive voltage and/or current, and providing illumination by the illumination source. In the method, when a length and/or diameter of the weave is adjusted, the other of the length and/or diameter of the weave is changed in relation thereto.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a cross section view illustration of the flashlight taken along line 2-2 of FIG. 1 according to the present invention;

FIG. 3 is an exploded side view illustration of the head and tail parts shown in FIGS. 1 and 2 according to the present invention;

FIG. 7A is a side view illustration of a conventional push-type positioning member;

FIG. 7B is a perspective view illustration of another conventional positioning member;

FIG. 7C is a perspective view illustration of a conventional positioning member including a quick release cam member;

FIG. 8A is a perspective view illustration of a foldable head portion according the present invention;

FIG. 8B is a perspective view illustration of the foldable head portion of FIG. 8A in a folded configuration;

FIG. 8AA is a perspective view illustration of the foldable head portion of FIG. 8A including optional side extensions;

FIGS. 8C-8D are side view illustrations of the foldable head portion shown in FIGS. 8A-B;

FIG. 8E is a side view illustration of a foldable head portion used in the flashlight shown in FIG. 8AA;

FIG. 13 is a cross section view of a flashlight according to the present invention;

FIG. 14A is a perspective view illustration of a battery pack according to the present invention;

FIG. 14B is a detailed cross section view illustration of the battery pack of FIG. 14A;

DETAILED DESCRIPTION OF THE INVENTION

Preferred embodiments of the present invention will be described in detail with reference to the annexed drawings. In the following description, a detailed description of known functions and configurations incorporated herein will be omitted when it may obscure the subject matter of the present invention.

Note that throughout the present invention, interchangeability of components is contemplated and the corresponding terms throughout this specification including the claims may therefore be substituted for one another as desired as would be reasonable to one skilled in the art. For example, a light emitting diode (LED) may be substituted for an incandescent bulb. Likewise the flexible battery holder may be attached to another device (e.g., a cellular phone, a PDA, a battery charger, a USB port, etc.) for providing power to and/or receiving power from (e.g., in the case of the battery charger) the other device. Power sources used in the present invention may include batteries, capacitors, fuel cells, etc.

Figure 1A:
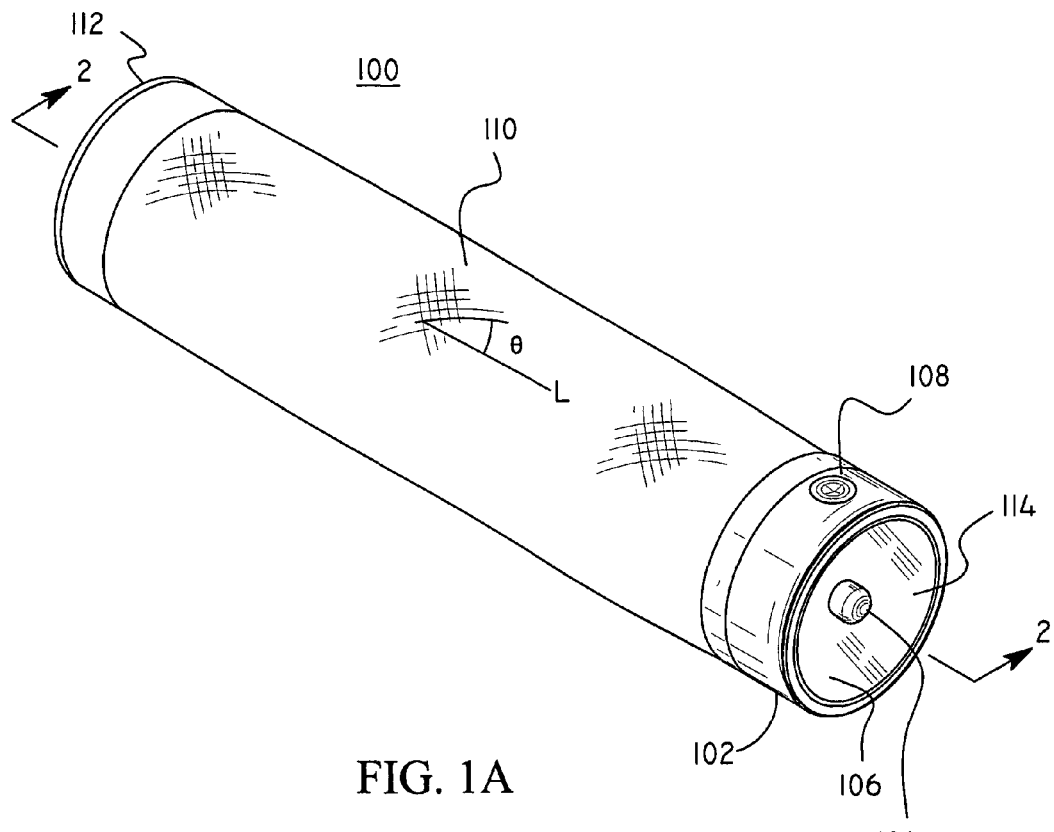
FIG. 1A is a perspective view illustration of a flashlight including a flexible weave battery holder according to the present invention.

A perspective view illustration of a flashlight including the flexible battery holder according to the present invention is shown in FIG. 1A. The flashlight 100 includes a head part (assembly) 102, a body part 110, and an optional tail part (assembly) 112. Although a description of the head and tail parts will be given in this application, it should be understood that other head and/or tail parts such as, for example, conventional head and/or tail parts may be used with the present invention. Moreover, the present invention may also be used with at least part of a body part of a conventional flashlight. For example, with reference to U.S. Pat. No. 6,296,368 B1, entitled "Rechargable Miniature Flashlight," to Maglica et al. (Maglica), the body part 110 of the present invention may be used with the head assembly and or tailcap as taught by Maglica. Moreover, the barrel as taught by Maglica can be sectioned such that a portion that is adjacent to the tail part is attached to the body part 110 of the present invention such that the tail cap as taught by Maglica can be used with the present invention. Likewise at least part of the barrel that is adjacent to the head assembly can be attached to the body part 110 of the present invention. Accordingly, the present invention may be used with conventional flashlights and components thereof.

The head part 102 includes a light source (i.e., a light emitter such as one or more incandescent bulbs, fluorescent bulbs, LEDs, etc.), an optional reflector (or lens) 106, an optional protective cover 114, and a circuit member including an optional switch 108. The body part 110 may include an optional conductive member (e.g., one or more conductive strands or other conductive elements) that can conduct power to and/or from one or more batteries (not shown) contained therein. An optional converter such as a voltage/current regulator, may be used to provide a desired voltage and/or current to various elements, such as, for example, the light source or to the batteries.

The body part 110 is formed using a flexible weave and is attached (e.g., fixedly or releasably) to the head part 102 and/or the tail part 112 (or to a barrel part of, for example, a conventional flashlight as will be described below). Because it is formed from a flexible weave, its size and shape can be adjusted to accommodate different numbers of batteries and different types and sizes of batteries. The weave of the body part 110 is preferably formed using at least some conductive material(s) so that it can conduct a current along its longitudinal length or parts thereof. For example, the weave may be formed using, for example, polymers and/or conductive strands. The polymers may be coated with, for example, a vapor deposited metal (e.g., aluminum, etc.) so that they may be conductive and/or have a desired color (e.g., gold, silver, etc.).

Figure 1B:
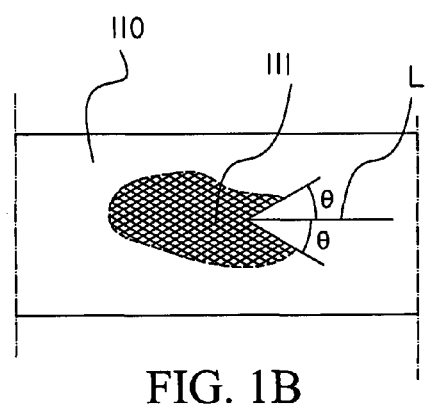
FIGS. 1B-1C are side view illustrations of the flexible weave battery holder according to the present invention.
Figure 1C:
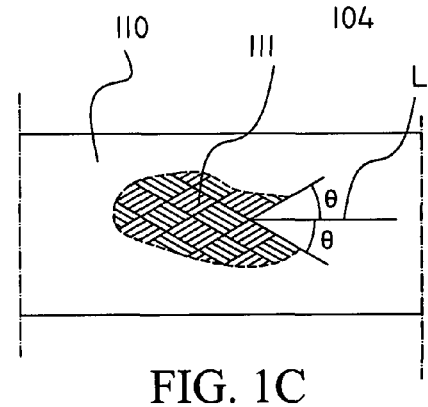

FIGS. 1B and 1C are side view illustrations of the flexible weave battery holder according to the present invention. As the body part 110 is extended longitudinally, angle Θ decrease. Conversely, as the length of the body part 110 decreases (e.g., causing a diameter (or area, which is, for example, normal to the longitudinal axis and located at a given point along the longitudinal axis) of an interior cavity to increase), angle Θ which is determined by one or more strands 111 and the longitudinal axis L of the body part increases relative thereto. The weaves in FIGS. 1B and 1C differ in pattern as shown. It should be noted that although the interior portions of the body part may not assume a circular shape throughout and may assume other shapes such as an elliptical shape, etc. which is determined by, among other things, the batteries contained within, and the shape of the head and/or tail parts, whether the body part is folded, tied, etc. Accordingly, as the length of the body part (or parts thereof) expands/contracts a portion of an area of a cavity defined within the body part contracts/expands accordingly. Weaves may also be known as Braided Expandable Sheathing. Depending upon the use, weaves may include materials such as, for example, metals, polymers, polymides, aramids (e.g., Aramid™), fiberglass, etc.

As shown in FIG. 1C, the weave has a different pattern from the weave of FIG. 1B. Further, although not shown, the characteristics of the strands in a first direction (e.g., the warp) may be different from that of the strands in the second direction (e.g., the weft) which are interwoven with the strands of the first direction. Although several strands are shown paired together in either direction and other numbers of strands may be paired together (e.g., 2, 3, 4, . . . , etc.), in the preferred embodiment, three strands are paired together in either direction. Further, adequate spacing should be provided between strands in either direction so as to allow for expansion and/or contraction of the weave. Moreover, the electrical devices, such as, for example, LEDs, EL elements, switches, etc. may be coupled to the weave of the body and may be individually addressable. For, example, if using a single conductive strands (or group of strands) in a first direction (e.g., the warp), a switch, an LED, etc. may be placed across a gap in these strands and may be operative to provide illumination, switching on/off of power, depending upon use. Further, conductive areas of the strings (e.g., polymer strings) may be controlled so that various electrical components, e.g., capacitors, resistors, switches, illumination sources such as LEDs, etc. may be placed across strands (e.g., strands which have a break in their conductors) in the same direction or between strands which cross each other. For example, if components are placed between strands which cross each other, a row and column-type addressing scheme may be used. Although a single layer weave is preferred, a multiple-layer weave is also envisioned.

Returning to FIG. 1A, the tail part 112 is attached (either fixedly or releasably) to the body part 110. The tail part 112 can include a voltage/current regulator and an optional switch (not shown) for controlling power to the light source. However, at least some of these components are optional and may be located in other areas of the flashlight (or battery pack) according to the present invention.

To adjust to the length of the totality of batteries 124 that are stored in the body part 110, either or both of the tail and body parts 112 and 110, respectively, may include an optional length adjusting member such as, for example, a biasing member (such as one or more springs, etc.), a screw adjuster, and/or elements that position the head and/or tail part relative to the body part such that one or more batteries contained within the flashlight 100 are held in a desired position. In this regard, for example, although not shown, an end of the body part 110 may be attached to a ring (not shown) that can be slideably located relative to the longitudinal axis of the head part or, for example, a head part including part of a barrel part such as is taught by Maglica. Accordingly, the ring can slide along part of, for example, the barrel that is attached to the head part. The ring part can then be biased using a biasing member such as a spring or clamp that is mounted to the barrel or head parts. Therefore, dependent upon the type and number of battery cells included in the body part 110, the biasing means can adjust at least part of the length of the body part accordingly such that one or more batteries contained in the body part are firmly held in position and terminal contact (i.e., contact between circuit means and battery terminals as well as contact between adjacent battery cells—if multiple serial cells are used) is maintained.

Many of the components of the present invention may be placed in different parts and/or areas of the present invention. For example, with proper discretion, switches, biasing means, voltage/current regulators, etc., may be placed in the body, tail and/or head parts, as desired. Moreover, based on the location of these components, a circuit can be established to conduct power from batteries to the illumination source.

A cross section view illustration of the flashlight taken along line 2-2 of FIG. 1A according to the present invention is shown in FIG. 2. For the sake of clarity, FIG. 2 has not been cross hatched. The body part 110 is connected to the head and/or tail parts 102 and 112, respectively, using any suitable method. For example, the head and/or tail parts 102 and 112, respectively, may be attached to the body part 110 using a compressive fit, a clamp (such as a ring, a band, a spring clamp, an elastic band, etc.), an adhesive bond, an epoxy bond, a heat-type bond, a friction bond such a radio frequency (RF) bond, etc., as desired. The head part 102 includes the light emitting source 104, the protective cover 106, a circuit which can include the switch 108. Although the head and tail parts are depicted as having substantially similar diameters, such need not be the case. For example, the head part can have a diameter that is much greater or smaller than the tail part. Moreover, the diameter of the head and/or tail parts can be greater or smaller than the expected size of batteries placed in the body part. Likewise, partial barrel portions that are attached to the head and/or tail parts may also have different diameters or have various shapes such as elliptical, square, etc., as desired.

The circuit includes circuitry necessary to complete a circuit for providing power from the batteries to the light source and may include electrical contacts, lugs, leads, etc., as is known in the art. A benefit of the present invention is that the woven body part may form at least part of the circuit. As shown in FIG. 2, the circuit optionally includes a voltage/current controller (converter) 116 that can include a voltage and/or current regulator to regulate the power supplied from the one or more batteries so that it conforms to that required by the light emitting source (or the batteries). For example, if the light emitting source is a 3.0 volt incandescent bulb and 4 batteries are serially placed in the body part such that the output voltage is 6.0 volts, the voltage/current controller would limit the output voltage to about 3.0 volts or less to protect the bulb. Moreover, when using an LED, it may be desirable to limit voltage and/or current so that they are substantially within the LEDs threshold. Additionally, overvoltage and/or overcurrent conditions may be produced for limited periods of time (e.g., controlled by a timer, controller, etc.) to provide desired illumination. For example, 4 volts may be provided to a 3 volt bulb for short periods of time to provide increased illumination without causing significant damage to bulb's filament. Further, depending upon the type of battery, the voltage/current controller may control voltage and/or current so that the batteries parameters (e.g., overcurrent rating) are not exceeded. If used as a battery pack, the voltage/current controller may also control the charging of the cells and/or output power to another device as desired.

The voltage/current controller 116 may include circuitry to adjust the voltage and/or voltage (and/or current) waveform as desired. This circuitry may be coupled to the switch 108 and/or other control means (such as a switch, etc.) that can control, as desired. For example, by controlling the waveform of voltage provided to the light source, flashing light (e.g., for emergencies, etc.) can be provided. The voltage/current controller may control the amplitude of, for example, the voltage provided to the light source so control an amount of illumination. The voltage/current controller may be preset to provide desired voltage and/or current outputs or may be adjusted in real-time. For example, depressing switch 108 twice may set a flashing function that would cause the light emitting source 104 to output a "blinking" or flashing light as opposed to a constant light. Further, a particular light pattern (e.g., flashing pattern of infrared, polarized, etc. light) may be used which may be beneficial to, for example, identify users.

In summation, the voltage/current controller may include circuitry that would output other voltages and/or functions, as desired. For example, for additional light output, the voltage/current controller may output a voltage that is greater than the rated voltage of the light emitting source (e.g., 3.0 volts in the above-stated example) for limited or unlimited times, as desired. Moreover, the voltage and/or current control means may output optional functions (such as a step function, etc. to cause the light emitting source to output variable light output (e.g., a blinking function, etc.), and/or control the color of one or more LEDs that may be used for the light emitting source. In this regard, the voltage/current controller means may include a microprocessor, ramp function generators, and/or timers (e.g., a 555 timer) etc., as necessary to control its operation. The voltage/current controller may also include voltage and/or current limiters, which may be controlled by the microprocessor, as necessary to output proper voltage and/or current. A voltage sensor may also be included to detect the output voltage of the one or more batteries placed in the body part. Circuitry, such as the controller, may then determine the output voltage and control elements such as an optional voltage and/or current regulators to output a desired voltage and/or current. For the sake of simplicity, these circuits will not be shown. Further, the flashlight of the present application may includes a flexible printed circuit (FPC) in one or more of the head, tail, and/or body parts for conducting current as desired.

The lens 106 is preferably a standard flashlight lens for reflecting light and may assume various shapes, as desired. Although not shown, the lens may be adjustable relative to the light source 104 such that the "beam" of illumination may be adjusted, as is known in the art (e.g., see, Maglica) and will not be discussed further for the sake of clarity.

The tail part 112 can include a main part 140, a ring portion 130, an optional end part 136 (i.e., an end cap), and an optional biasing member 138. The end part 136 and the ring portion 130 are screwably attached to the main part 140 using threads 132. The biasing member 138 is optional and can be used to provide a biasing force against one or more batteries (or other elements) contained in a cavity of the body part 110. The weave of the body part 110 is preferably made from a non-elastic material. However, if the weave is made from elastic material, it may provide a biasing force. Accordingly, the biasing member 138 may be replaced with a conductive contact element (e.g., a conductive tape, strip, a ball, the weave itself, or any suitable element) contacting at least a portion of an adjacent cell and forming at least part of a circuit necessary for conducting power from the adjacent battery terminal.

Although the head and the tail parts are shown incorporating different elements, many of the elements that are included in the head part may be included in the tail part (in lieu of or in addition to those contained in opposite part). For example, the tail part can include the voltage/current controller 116, the switch, and/or other elements contained in the head part. Similarly, the head part may include elements such as a biasing member, as desired.

Although not shown in FIG. 2, the head and/or tail parts 102 and 112, respectively, may include a screw mechanism to control the distance between surfaces or elements which contact opposing polarities (i.e., sides) of the batteries. For example, a screw mechanism (or other sliding-type device) can be used to adjust the end part 136 along the longitudinal axis of the flashlight such that the elements contacting the opposing polarities of the batteries are "snugged" together. Accordingly, the flexible body portion can also be snugged against the batteries to maintain their position.

An exploded side view illustration of the head and tail parts shown in FIGS. 1A and 2 according to the present invention is shown in FIG. 3. The optional end part 136 is attached to the main part 140 using any suitable method. As shown, both the end part and the main part include threads 132 and 132, respectively, for screwably attaching to each other. The optional biasing member 138 is placed within receptacle 148 of the end part and may be held in place using any suitable method (e.g., a friction fit, adhesives, glues, etc.), as desired. The ring part 130 is attached to the main part using any suitable method. For example, threads 132 may be used to attach the ring part to the main part. When attached to each other, surfaces 144A and 144B of the main part and the ring part are located adjacent to each other such that the body part 110 can be firmly held in place. In this regard, a roughened surface (e.g., including slight protrusions, etc.) may be used to better locate the body part 110. Moreover, surfaces 144A and 144B may have slightly different angles relative to each other such that they may concentrate forces in a limited area to better maintain contact with and hold the body part 110. As shown the body part 110 is formed from a flexible weave (only one strand of which is shown in FIG. 3 for the sake of clarity). A contact element 142 may be used (if, for example, the tail part is formed of a non-conductive polymer) to form a circuit between the body part 110 (or a conductive element of the body part) and the biasing member 138, as shown. However, if the end part 136 is formed from a conductive material (e.g., aluminum) or if other circuit elements are provided, optional elements, such as, for example, the contact element 142, may not be necessary.

The head part 102 includes a first part 102A and a second part 102B (which is similar to the ring part described above with respect to the tail part) which may be attached to each other using any suitable method, such as, for example threads 132. The body part 110 (only a single strand of which is shown for the sake of clarity) is placed between surfaces 144D and 144C of the first and second parts, respectively. The body part 110 is preferably sized such that batteries of a given length may be placed within it.

Although not shown, the tail part 112 preferably has a diameter that is smaller than the head part 102. However, as will be described below, the head and/or the tail parts may be other than circular elements. Accordingly, either or both of the head and tail elements should have a size and a shape such that the largest and smallest batteries that is envisioned to be placed within the body part may pass though openings in either or both of the head and tail parts and be properly held in position by either or both of the head and/or tail parts.

Figure 4A:
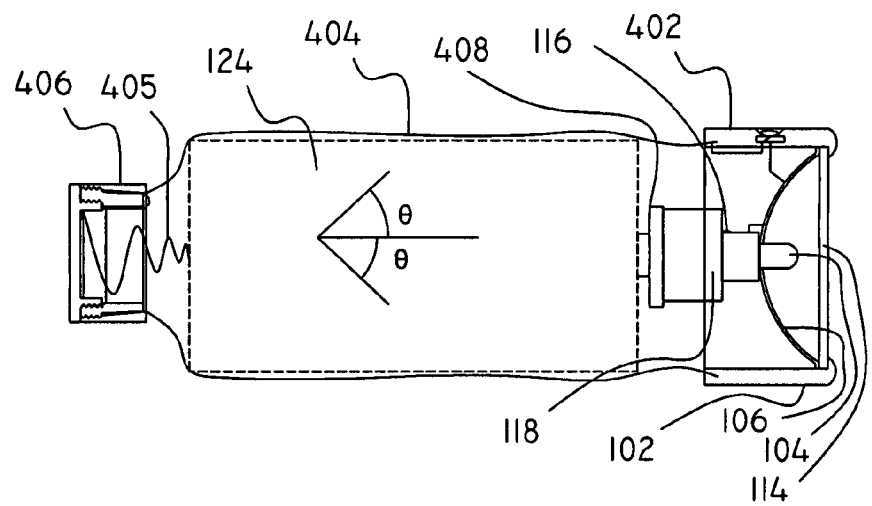
FIG. 4A is a cutaway side-view illustration of a flashlight according the present invention including a single D cell battery.

A cutaway side-view illustration of a flashlight according the present invention including a single D cell battery according to the present invention is shown in FIG. 4A. The flashlight 400 is similar to the flashlight shown in FIGS. 1A-3 and includes a head part 402, a body part (e.g., made from a conductive weave such as brass) 404, and a tail part 406. As shown the body part 404 expands and contracts in diameter to firmly hold the D cell battery. The biasing means provides a biasing force upon the body part so that the electrical contact can be maintained between the battery terminals and the flashlights circuitry. The head part is similar to the head part shown in FIG. 1, with an exception being the extension of contact 408 in the lateral direction as shown.

Figure 4B:
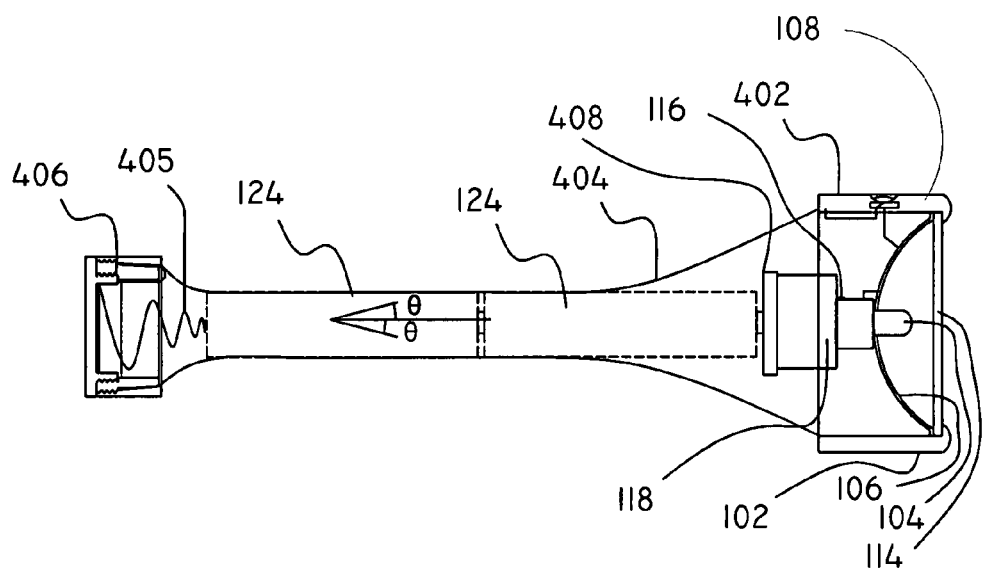
FIG. 4B is a cutaway side-view illustration of the flashlight shown in FIG. 4A with two AA-size batteries inserted within the body part according to the present invention.

A cutaway side-view illustration of the flashlight shown in FIG. 4A with two AA-size batteries inserted within the body part according to the present invention is shown in FIG. 4B. The flashlight 400 includes a head part 402, a body part (e.g., made from a conductive weave such as brass) 404, and a tail part 406. As shown the body part can expand/contract in diameter to firmly hold the AA batteries in place. A biasing member 405 provides a biasing force upon the body part so that electrical contact can be maintained between the battery terminals and the flashlights circuitry.

Figure 5A:
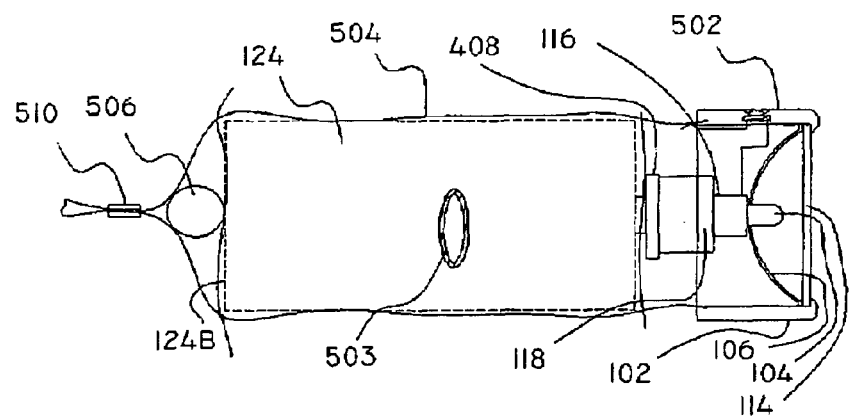
FIG. 5A is a cutaway side-view illustration of a flashlight including a single battery cell according to the present invention.

A cutaway side-view illustration of a flashlight including a single battery cell according to the present invention is shown in FIG. 5A. The flashlight 500 includes a head part 502, a body part 504, a contact part 506, and a positioning member 510. As shown, the body part 504 is optionally molded to the head part 502. The contact part 506 completes an electrical circuit between the end of an adjacent battery 124 (e.g., see, end 124B) and the body part. In the above example, the body part 504 is preferably made from a conductive material (e.g., a copper braid) or may be made substantially from a polymer with one or more conductive strands (e.g., copper wire, coated wires, etc.), as necessary, to form an electrical circuit between the transfer part and the head part (e.g., the switch, the bulb, etc., as necessary to transfer power for illumination). The contact part 506 is held in contact with an adjacent terminal of the battery (e.g., surface l24B—as shown) by the positioning member 510. As shown, the contact part preferably comprises a ball bearing. However, the contact part may be made in other shapes and/or sizes as desired. For example, the contact part may include a nut, a round or oval slug, a sheet of foil, etc. The positioning member tightens around the body part so that the contact part is held in a proper position. Suitable positioning members can include clamps, spring clips, etc. that can provide a sufficient force to hold the contact part in place. Further, if desired, the body part may be tied in a knot so that the batteries are held in place. Moreover, the body part may directly contact a terminal of an adjacent battery so that power from the battery can be transferred to the body part.

Figure 5B:
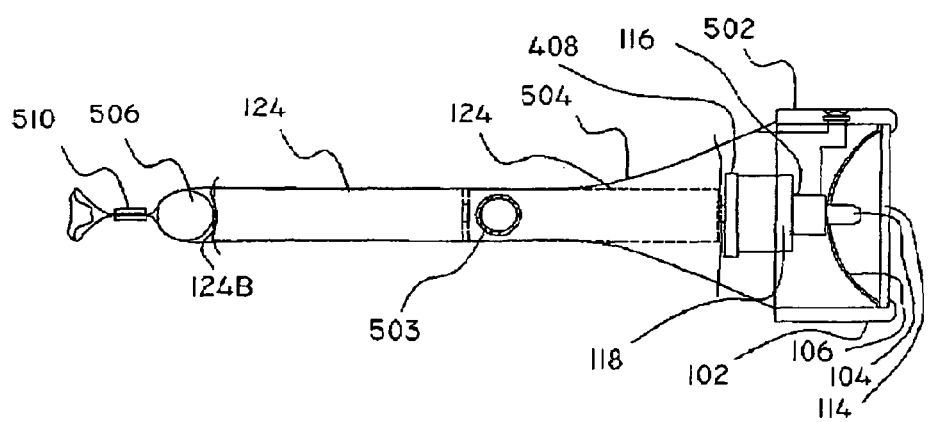
FIG. 5B is a cutaway side-view illustration of a flashlight shown in FIG. 5A including two smaller cells according to the present invention.

A cutaway side-view illustration of a flashlight shown in FIG. 5A including two smaller cells according to the present invention is shown in FIG. 5B. As shown, the body part 504 expands in length and contracts in diameter, as necessary, to contain the two cells 124. An additional aspect of the present invention is to provide a novel device and method for displaying at least logos, text 503, graphics. etc. formed on the body part 504 thereof such that when the diameter and/or length of the body part 504 is changed, the aspect ratio (i.e., the ratio of the height to the width) of the Logos, text, graphics, etc. also changes.

With reference to FIGS. 6A-7D various positioning members will be shown. However, other suitable clamps may be used with the present invention. For example, the positioning member may comprise a string, rope, or even part of the body part itself. Further, the body part (and/or other elements) may be melted into position, as desired by the user. This may be beneficial for emergency one-time use devices such as flashlights, battery chargers, etc.

Figure 6A:
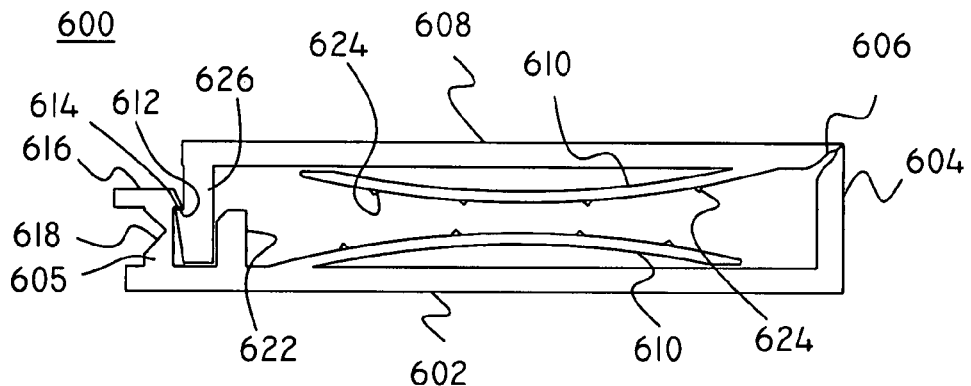
FIG. 6A is a side view illustration of the positioning member shown in FIGS. 5A and 5B.

A side view illustration of the positioning members shown in FIGS. 5A and 5B is shown in FIG. 6A. The positioning member 600 is preferably formed from a polymer and includes a base 602, a first and second sides 604 and 605, respectively, hinge 606, a hinged part 608, one or more biasing elements 610 associated with at least one of the base portion or the top portion, latching elements 612 and 614 associated with an extension 626 of the hinged element 608 and the second side 605, respectively. The hinged part 608 is held in a locked position by a latching elements 612 and 614 which are latchedly attached to each other. The second side 605 includes a tab part 616 and a weakened part 618 such that when a force is applied against the tab part 616, a notch 614 of the second side 605 is displaced away from the latching element 612 and the hinged element 608 can be rotated about the hinge 606. An optional locating element 622 positions the latching part 612. Biasing elements 610 are attached on at least one side to the base part 602 or the hinged element 608, respectively. Biasing elements 610 may also include protrusions 624 to prevent slippage of the body part when the positioning member is locked. The free end of the biasing elements 610 may slidably engage the adjacent surface when the biasing element is displaced.

Figure 6B:
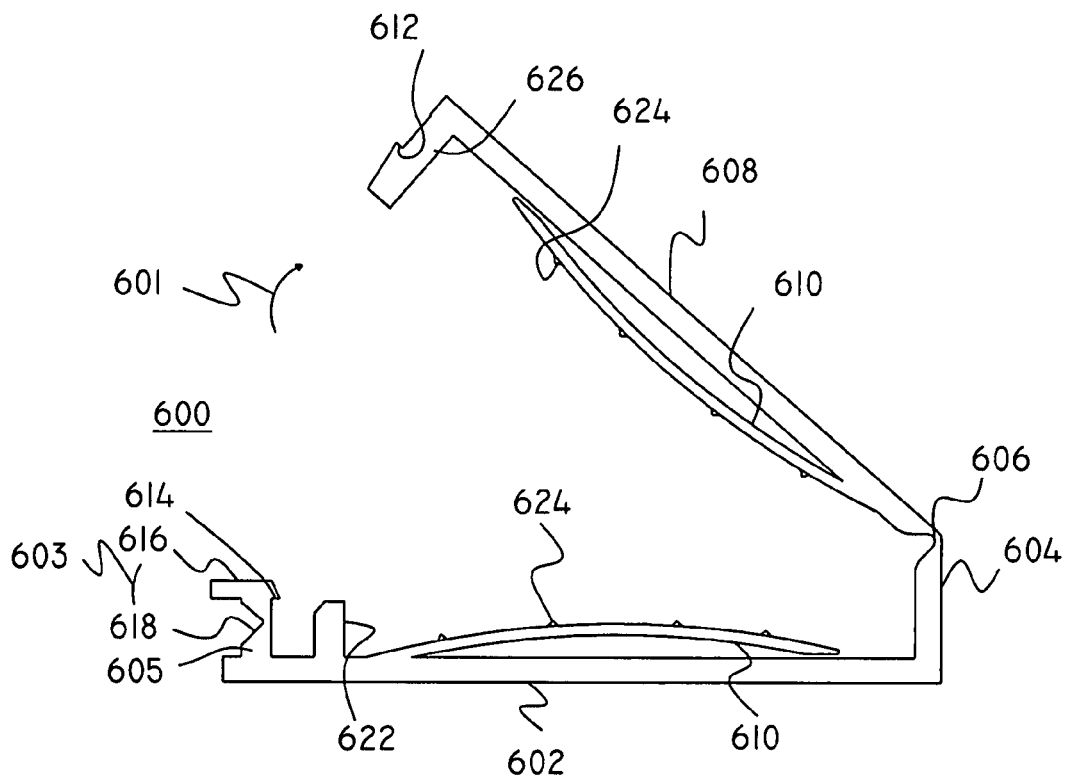
FIG. 6B is a side view illustration of the positioning member shown in FIG. 6A with the hinged part open.

A side view illustration of the positioning member shown in FIG. 6A with the hinged part open, is shown in FIG. 6B. When opened, the hinged part 608 rotates about the hinge 606, as shown by arrow 601.

A side view illustration of a push-type positioning member according to the present invention is shown in FIG. 7A. The push-type clamping member 700 is known in the art and includes a body part 702, an anvil part 704, at least one hole 706 defined between the anvil part and an opening 706A of the body part 702 for accepting a desired element to restrain (i.e., the body part 702 in the present application), and a push element 708 for accepting a force applied by a user to displace the anvil part 704 and release the clamping member 700. A biasing element (e.g., a spring—not shown) may be included within the body part 702 to maintain a biasing force against the inserted element to restrain (i.e., the body part 702). Push-type positioning means are commonly used to adjust straps (or cords) on clothing and other personal items such as backpacks, etc.

Alternatively, rather than using a separate positioning means, a knot may be tied using the body portion to close the cavity formed in the body portion and maintain the one or more batteries contained within the cavity of the body portion. Accordingly, it is preferable to insert a conductive object (e.g., the ball bearing, a coin, a slug, metal foil, etc.) into the cavity such that it is in contact with a surface of an adjacent battery (e.g., the positive of negative terminal of the battery) so that it can form a circuit between the adjacent battery terminal and the body part 702. However, if the body part 702 directly contacts the adjacent battery terminal, the conductive object may not be necessary. Further, an adhesive such as, for example, a conductive adhesive, may be used to attach the body part to an adjacent terminal.

A perspective view illustration of a positioning member according to the present invention is shown in FIG. 7B. The positioning member 710 includes a body 712 having a cavity 714, and at least one clamping member 716 (e.g., a screw—as shown, a cam, etc.) for applying pressure against an element to be positioned (e.g., the body part).

A perspective view illustration of yet another conventional positioning member including a quick-release cam member is shown in FIG. 7C. The positioning member 720 includes a main part 722 having a holding part 724 and a hinge part 726, and a clamping part 728 rotatably attached to the main part 722 and rotating about the hinge part 726 for applying pressure against an element to be positioned (e.g., the body part) within an opening 730 formed between a surface 728S of the clamping part 728 and the holding part 724. When the body part is properly inserted and the quick-release cam member is in a closed position, the body part can be locked in place when the clamping part is rotated in the direction of arrow 732. Such positioning members are conventionally used to adjust the length of various clothing articles such as belts.

Figures 7D, 7E, 7F:
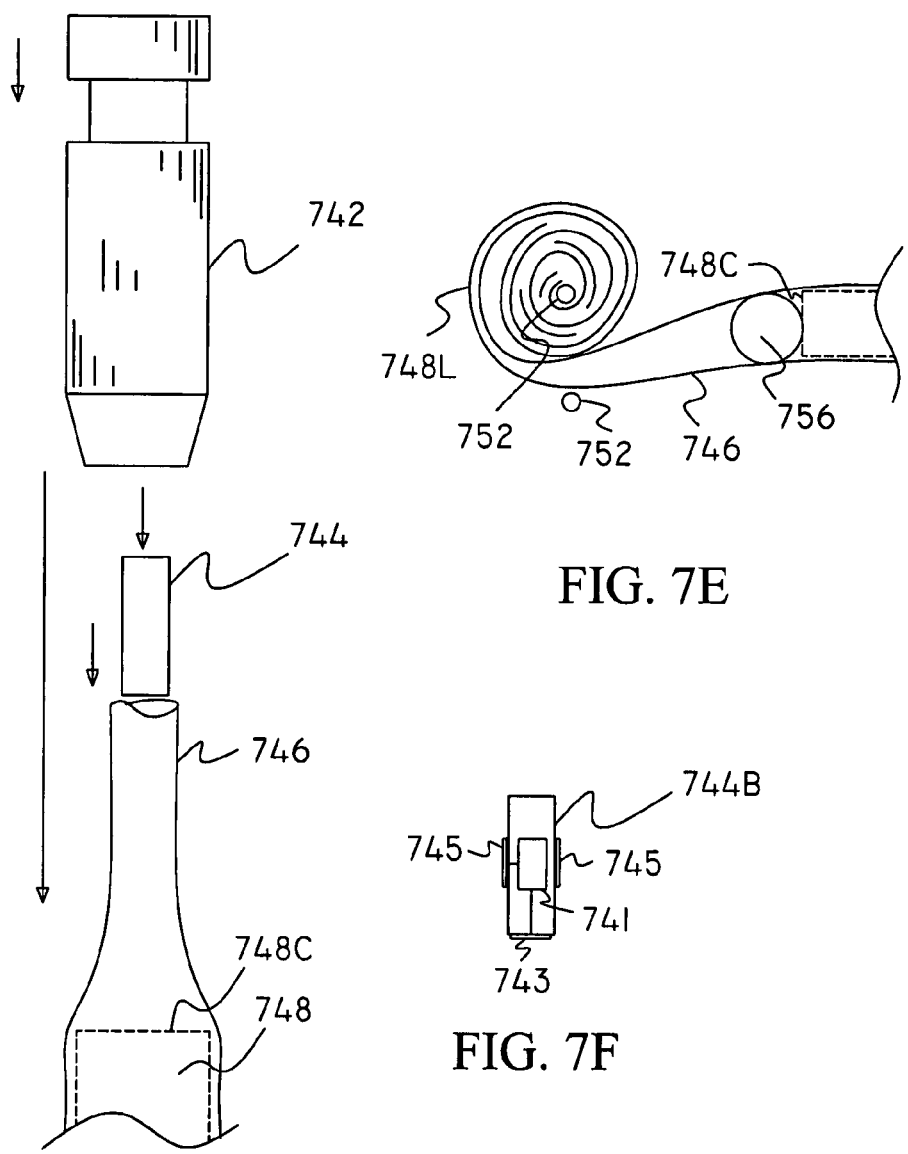
FIG. 7D is a side view illustration of a positioning member including a conventional rope adjusting member according to the present invention.
FIG. 7E is a cutaway side view illustration of a positioning member including a second clamping member.
FIG. 7F is a cross sectional view illustration of a plug switch according to the present invention.

A side view illustration of another conventional positioning member including a conventional rope adjusting element is shown in FIG. 7D. The positioning member 740 includes a main part 742, which is similar to conventional rope (or laundry-line) adjusting members, such as, for example, a "Cloth Line and Utility Line Tightener" sold by the Lehigh Group, Macungie, Pa. In use, an optional plug 744 can be placed within the body part 746 and the main part 742 slideably engages (e.g., in the unengaged position) the body part 746. The main part 742 is then "locked" in place so as to hold the optional plug 744, which, in the present case, is conductive and thus completes a circuit between an adjacent battery terminal 748C of battery 748 and the body part 742. The plug 744 may be shaped and sized as desired. Additionally, the plug 744 may include an internal switching member, such as, for example, a shock (or impact)-operated switch that would complete a circuit (i.e., switch "on") when subject to a shock and/or an impact. The switch may also include a timer for switching "off" a circuit after a given amount of time. Such switches are commonly used in novelty toys, and thus, for the sake of clarity, a further description will not be given. However, optional plug 744B (shown in FIG. 7F) is shown in a cross-sectional view including switch 741 for completing a circuit between a first contact 743 (located on at least one end) and a second contact 745. The first contact 743 is suitable for making contact with a battery terminal and the second contact is suitable for making contact with the body part 746 (or end part—not shown). The switch preferably switches on for a predetermined period of time when subject to an impact (such as by striking against a user's hand) and includes a timer (and/or a controller) for turning the switch off after the predetermined period of time elapses. Although not shown, the end of the body part 746 may be folded into itself, as desired. Although a plug 744 is shown, other contact members which can complete an electrical circuit between an adjacent battery terminal and the body part may be used as desired.

A cutaway side view illustration of a positioning member including a second clamp is shown in FIG. 7E. In use, a conductive body part 746 is folded about itself and may form a loop 748L, as shown, and an optional second clamp 752 (i.e., a "U" clip, a spring clip, etc.) holds the loop 748L in place such that a contact part 756 maintains contact with an adjacent battery terminal 748C so as to form a circuit between the adjacent battery terminal 748C and the body part 746. The second clamping may include a strand and/or a wire that is tied into place, a spring, etc. Further, it is also envisioned that the positioning member may include a device such as a clamp, a strap, etc. (now shown) which is placed over the loop 748L so as to hold the loop in place and prevent it from unraveling. Moreover, an adhesive may be used to prevent the loop from unraveling.

A perspective view illustration of a foldable head portion according to the present invention is shown in FIG. 8A. The head portion 800 is formed from a sheet of material 802 having first and second weakened lines 804 that delineate (or substantially delineate) a main portion 806 and first and second side portions 808 and 810, respectively. The sheet 802 includes top and bottom sides 812 and 814, respectively located on opposite portions thereof, and side portions 816. The sheet is preferably made from a polymeric material that is semi rigid so that its shape is maintained during use. On or more optional holes 820 are formed in the sheet 802 and provide an optional access path to illumination source leads not shown. The flashlight head formed according to the present invention may be folded and placed in a standard mailing envelope. If desired, additional side portions (not shown) can be attached at to the side portions 808 and 810 at the outer periphery of the side portions.

A perspective view illustration of the foldable head portion of FIG. 8A after it has been folded is shown in FIG. 8B. The first and second side portions 808 and 810 are folded at lines 804 so that their respective top and bottom sides 812 and 814 are respectively adjacent (or otherwise next to) each other. The top and bottom sides 812 and 814 may be optionally attached to each other using, for example, an adhesive tape (not shown), etc.

A perspective view illustration of the foldable head portion of FIG. 8A including optional side extensions is shown in FIG. 8AA.

A perspective view illustration of a foldable head portion used in the flashlight shown in FIGS. 8A-8B is shown in FIG. 8C. The head portion 800C includes an illumination source 822 that is mounted to an optional mount 824 that includes an optional voltage/current regulating means (not shown). The illumination source 822 may include any suitable light emitting device (e.g., an LED, as shown). The mount 824 includes a contact 826 for making contact with an adjacent terminal of an adjacent battery (not shown). The contact 826 may include a biasing member (e.g., a spring—not shown) for maintaining a circuit, as desired. The surface 806S of the main portion 806 may be coated with a desired material to reflect or otherwise interact with illumination provided by the illumination source 822. For example, the surface 806S may be coated with a vapor deposited aluminum for reflecting incident light rays. Accordingly, depending upon desired reflective characteristics (e.g., desired beam dispersion, focusing, etc.), the first and second weakened lines 804 may be shaped as desired to cause the surface 806S to assume a desired shape when the head portion 806 is folded. In alternative embodiments, the illumination source 822 may be surface mounted. For example, if more curvature of the surface 806S is desired, the weakened lines 804 can be curved away from each other towards the center of the sheet 802. Conversely, if less curvature of the surface 806S is desired, then the weakened lines 804 would not bow out as much towards the center of the sheet 802. The LED 822 may be surface mounted. A resistor of a known value may be used to provide a specified (i.e., within range) current/voltage to the LED 822. In other embodiments, the surface 806S can include an electroluminescent (EL) light source for providing illumination. In yet other embodiments, a plurality of light sources (e.g., incandescent, LED, etc.) may be used. For example, the main portion 806 may include the EL light source (surface mounted LEDs, etc.) for providing illumination.

A side view illustration of a foldable head portion used in the flashlight shown in FIGS. 8A-8B is shown in FIG. 8D. The foldable head portion 800D is essentially similar to the head portion shown in FIG. 8C with a difference being the LED is mounted to a surface 806S' which lies opposite surface 806S of the sheet 802.

A partial cutaway side view illustration of a foldable head portion used in the flashlight shown in FIG. 8AA is shown in FIG. 8E. The foldable head portion 800E is essentially similar to the head portion shown in FIG. 8C with a difference being the inclusion of additional side portions 832 (only one of which is shown) which are folded back over the side portions 808 and 810. Accordingly, a mounting procedure can be similar to the mounting procedure of the foldable head section 800D. The head portion may be attached to the body part using an adhesive such as a conductive adhesive, etc.

Figure 9A:
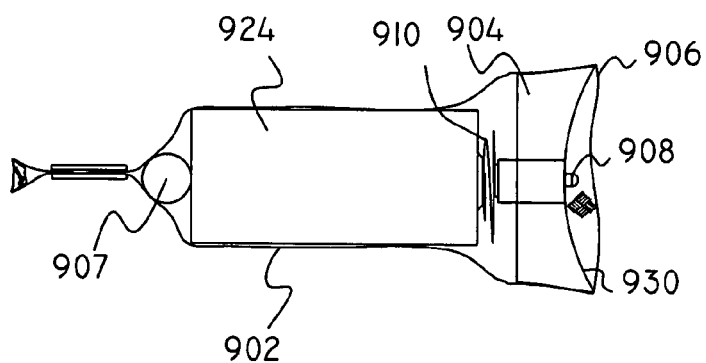
FIG. 9A is a cutaway side view illustration of the head part shown in FIG. 8C mounted in a body part according to the present invention.

A cutaway side view illustration of the head part shown in FIG. 8C mounted in a body part is shown in FIG. 9A. The flashlight 900 includes a body part 902 and the head part 904. The body part 902 is preferably conductive. The body part 902 is folded adjacent to end 906 and contains the head part 904. The head part 904 preferably has a vapor deposited metallic coating deposited on at least part of a surface which is in contact with a conductive part of the body part 902. Accordingly, illumination source 908, such as an LED, can be supplied power via a circuit which can include the body part 902. Although the head part 904 is oval when viewed from the front of the flashlight 90, the body part can assume a circular shape (or a substantially circular shape) about the battery (or batteries) 124 dependent upon the size and shape of the batteries.

Figure 9B:
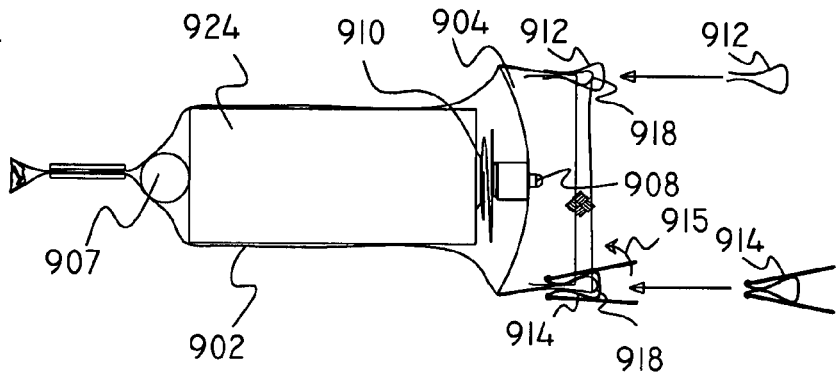
FIG. 9B is a flashlight including the head portion shown in FIG. 8E according to the present invention.

A flashlight including the head portion shown in FIG. 8D is shown in FIG. 9B. The head part 904 may be inserted into a cavity of the body part 902 of the flashlight 900. An end portion (or both end portions) of the body part 902 may be folded back over themselves into the cavity and optionally over the side portions of the head part 904. The head part 904 may be adhesively (or otherwise) attached to the body part 902. Alternatively, clamping means, rings, clips, etc., may be used to hold the head part 904 in position relative to the body part 902. For example, the spring clips 912 and/or 914 may be used to hold the head part 904 in position relative to the body part 902 by providing a biasing force against the head and body parts 904 and 902, respectively. When using spring clips 912 and/or 914 (i.e., conventional paper clips), it is preferred that the body part 902 is folded about itself so that at least a portion of the head part 904 is sandwiched between the body part 902 adjacent to the fold 918, and thereafter the spring clips 912 and/or 914 be used to provide a biasing means to secure the body and head parts 902 and 904 together. If a conventional spring clip (e.g., 914) is used, its handles may be folded over itself (e.g., see, arrow 915). The body 902 is optionally folded back over itself.

The circuit can include a contact member 907 which transfers current from an adjacent terminal of the battery 924 to the body part 902 which then transfers the current to the head part 904. The LED 908 can then be provided with the current via biasing element 910 and the head part 904. It is assumed that the direction of flow of the current is not of import in the present invention.

An optional ring (having a desired shape, e.g., being circular, oval, etc.) and having a cross section that is similar to a front section of a corresponding head or tail part so as to be in accord with the shape of at least one of corresponding head or tail parts may be placed such that it sandwiches adjacent head and/or tail parts to that the body part and thus holds the head and/or tail parts in a desired position. Although not shown, the tail part can be made similar to the foldable head part with an exception being the lack of an optional illumination source.

Other types of suitable positioning members may also be used. For example, a clamp, a conventional rope holder, such as, for example, a laundry-line adjuster described above, a rope holder having an opening for accepting an object (e.g., a rope) and a clamping member for applying pressure against the inserted object, etc. may be used. Conventional strap holders (e.g., an "E" type strap holder having several openings may also be used. These strap holders are typically used to adjust straps on for example luggage and articles of clothing. For the sake of clarity as these positioning members are known in the art, a further description thereof will not be provided.

Figure 10A:
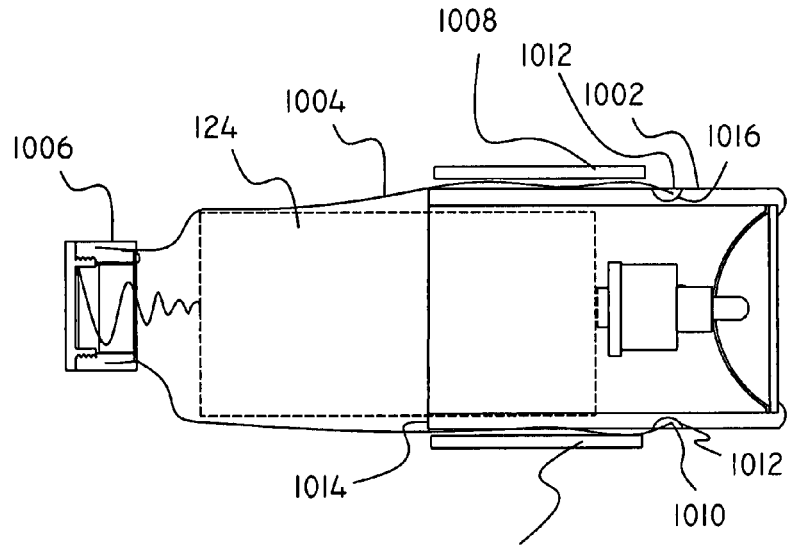
FIG. 10A is a cutaway side view illustration of the flashlight of the present invention with an adjusting part of the body part overlapping the head portion.

A cutaway side view illustration of the flashlight of the present invention with an adjusting part of the body part overlapping the head portion is shown in FIG. 10A. The flashlight 1000 is similar to the flashlight shown in FIGS. 1-3 and includes a head part 1002, a body part 1004 (e.g., made from a weave which preferably includes one or more conductive strands, and an optional tail part 1006. However, unlike the flashlight shown in FIG. 4A, the head part 1002 is extended so that excess material from the body part 1004 may be placed about the head part 1002 to take up any excess slack (an amount of which depends at least partially on the size and number of batteries contained in the body part 1004). Accordingly, the tail part 1006 may be fixed in location relative to the body part 1004. An adjustable clamping means 1008 (e.g., a spring clamp, a "C" clamp, a shrink fit clamp, an elastic band, etc.) situated about an outer part of the head part 1002, may be tightened about both the body and head parts 1004 and 1002, respectively, so as to hold the body part 1004 in a desired position relative to the head part 1002. Accordingly, one or more batteries 124 placed at least partially within the body part would then be held in position and a circuit can be provided. The adjustable clamping means may 1008 may include a screw clamp (with, for example, an optional butterfly type screw) that can be easily adjusted by the user. Such clamps are well known in the art and for the sake of clarity a further description thereof will not be provided. Although not shown, the head part 1002 may include a "flared out" portion (preferably located adjacent to end 1014) to better hold the body part 1004 in a desired position. An end 1010 of the body part 1004 is optionally fixedly attached to the body part 1004 (e.g., by molding it to the body part using, for example, material 1012, etc.). As shown, the head part 1002 may include an optional cutout 1016 or other area so that the body part 1004 may be molded thereto. Although not shown, the end 1010 of the body part 1004 may either be left free or may be molded into a circular (or other shape) ring (not shown) that can be located slideably or fixedly to the head part 1002. Although the battery 124 is shown at least partially positioned within a cavity formed by the head part 1002 the head part 1002 may be optionally sized such that it is smaller in diameter than at least the largest battery that is envisioned to be used with the flashlight. Accordingly, contacts can be provide (or extended) such that a proper circuit means is provided between an adjacent battery terminal and, for example, the illumination source. Clamp 1008 may include clamps such as spring clamps, screw clamps, ring clamps (e.g., shrinkable clamps, elastic clamps), etc. as is well known in the art and may be commonly found holding hoses in place in automobiles (e.g., radiator hose clamps).

Figure 10B:
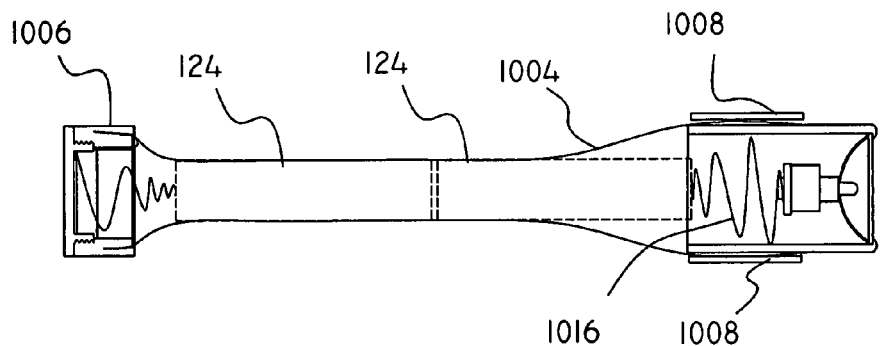
FIG. 10B is a cutaway side view illustration of the flashlight according to present invention.

A cutaway side view illustration of the flashlight according to present invention is shown in FIG. 10B. The flashlight 1020 is essentially similar to the flashlight shown in FIG. 10A above. However, the diameter of the head part 1002 is smaller and a second biasing means 1016 is included. An optional circuit may include a switch and/or other elements for completing a circuit from the body part 1004 to the illumination source, etc. and is not shown for the sake of clarity. Moreover, it should be understood that other flashlight head, tail and partial body parts may be incorporated with the present invention. Moreover, depending upon application, conventional head and/or tail parts may be used.

Figure 10C:
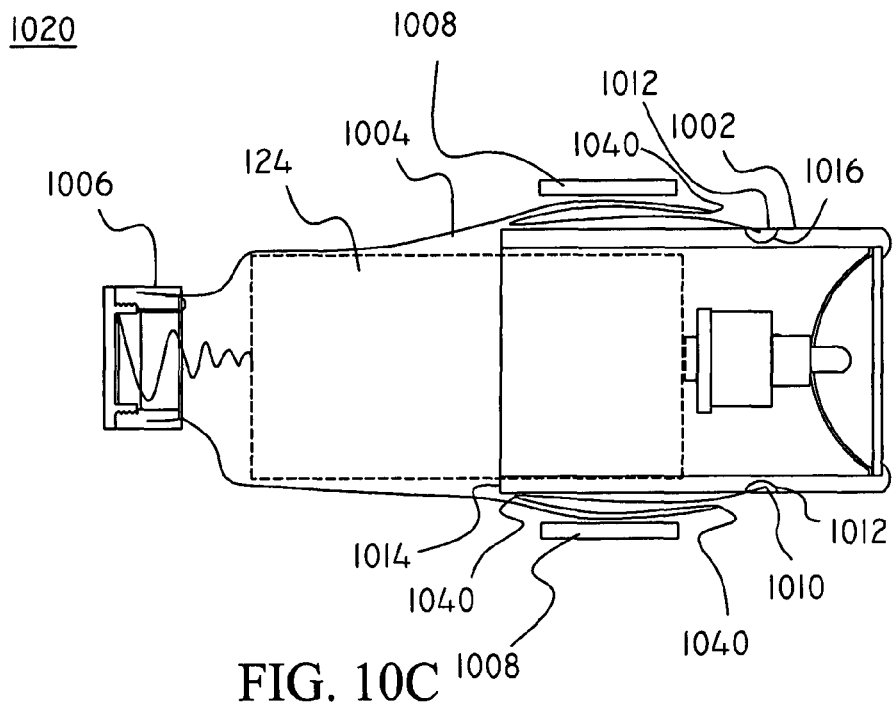
FIG. 10C is a cutaway side view illustration of the flashlight according to present invention having a body part folded about itself.

A cutaway side view illustration of the flashlight according to present invention, having a body part folded about itself, is shown in FIG. 10C. The flashlight 1020 is essentially similar to the flashlight shown in FIGS. 10A and 10B above. However, the body part 1004 is folded over itself in at least one area at folds 1040 so as to further adjust its length. A clamping means 1008 is used to hold the body part in place (preferably at the fold such that the fold does not unfold). Although the one or more folds 1040 are shown adjacent to the head part, they may also be located in other areas as desired. Accordingly, the flashlight body 1004 may be shortened for storage or to further adjust to the size and the amount of batteries contained therein. It is noted that although the body having a weave according to the present invention can be lengthened or shortened depending upon its diameter, other adjustment means may be necessary to properly accommodate a plurality of battery diameters and/or lengths. Additionally, the number of batteries used will also affect the length of the body part. Accordingly, one or more folds may be used to further adjust a desired length of the body part.

Figure 10D:
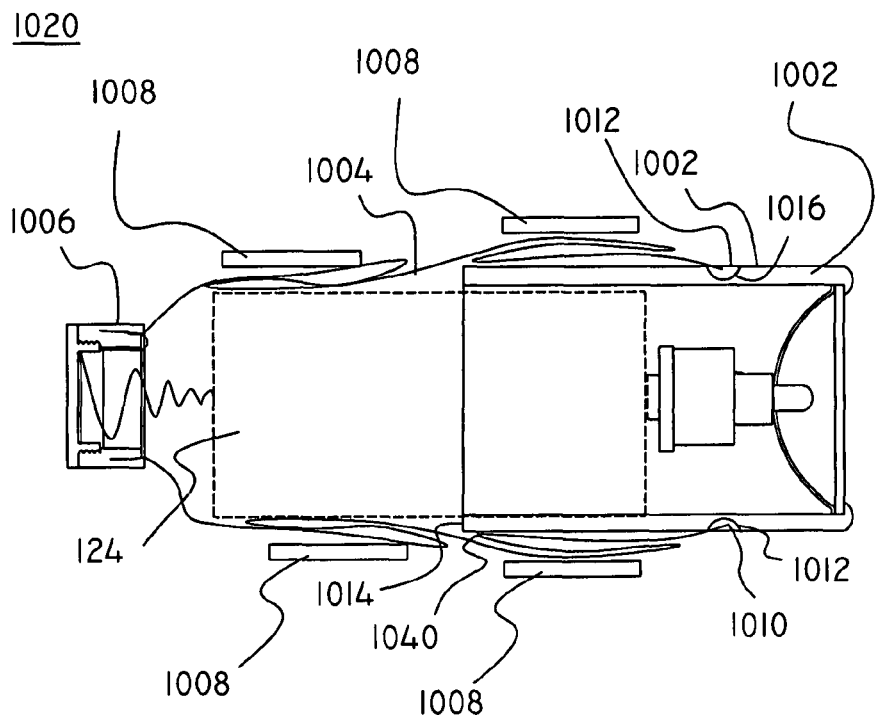
FIG. 10D is a cutaway side view illustration of the flashlight according to present invention having a body part folded about itself.

A cutaway side view illustration of the flashlight according to present invention having a body part folded about itself is shown in FIG. 10D. The flashlight 1020 is essentially similar to the flashlight shown in FIGS. 10A, 10B and 10C above, however, the body part 1004 is folded over itself in at least one area at folds 1040 in multiple areas so as to further adjust its length. The folds may also "roll" with the body as desired. Accordingly, the fold may be repositioned or removed entirely as desired. A second clamp 1008 is also shown. For the sake of clarity, the clamps shown in the present invention are not shown in a fully tightened position.

Figure 11:
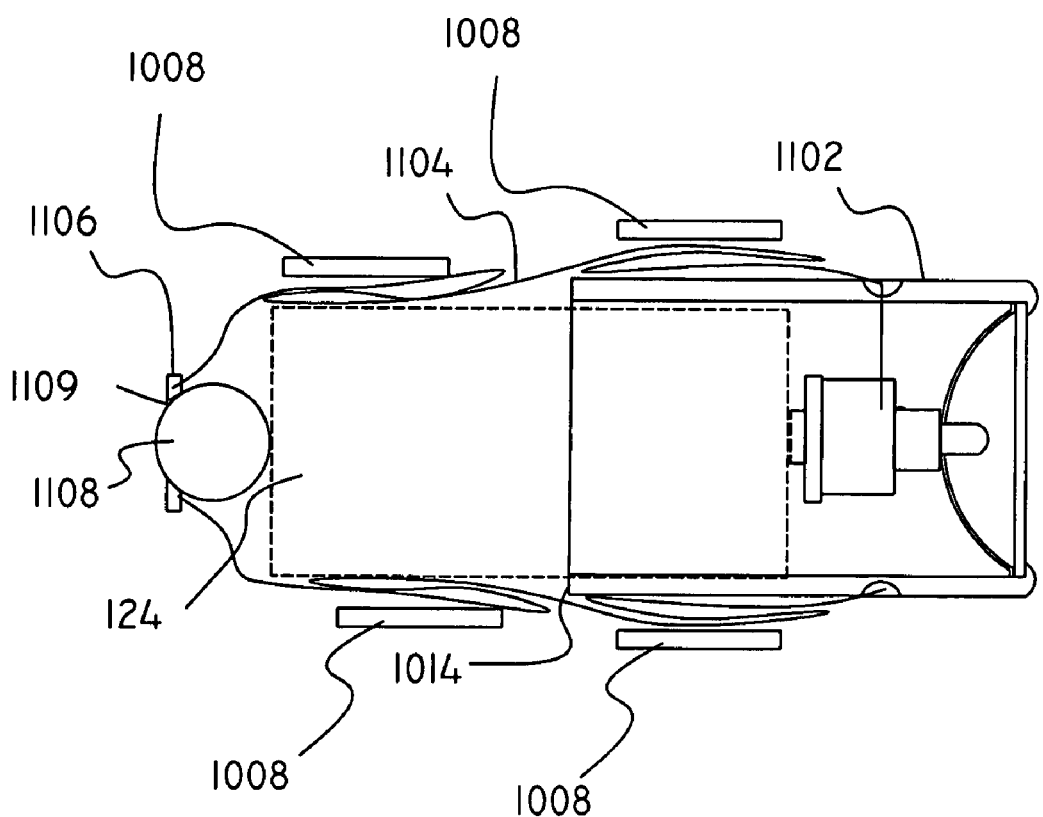
FIG. 11 is a side view illustration of a flashlight using a fixed tail part according to the present invention.

A side view illustration of a flashlight 1100 using a ring tail part according to the present invention is shown in FIG. 11. The body part 1104 and head part 1102 are similar to the flashlights shown in FIGS. 10A-D. However, the tail part includes a ring (or plate) 1106 having an optional opening 1109. The ring is optionally molded or otherwise fixedly attached to the body part 1104, the diameter of an optional opening 1109 in the tail part 1106 may be smaller than the diameter of either or both of a conductive element (e.g., a ball bearing) 1108 or a battery 124 (or batteries) such that the conductive element 1108 or the battery 124 is held in place within the body part 1104. It is also envisioned that rather than using the conductive element 1108, the ring part may include a center section that has a concave/convex shape that is suitable for contacting an adjacent terminal of the battery 124. The head part 1102 includes a loading means such that the batteries may be loaded through the head part as is known in the art. Additionally, the head part 1102 includes an optional switch (not shown) for completing a circuit and switching on the flashlight, as desired. The body part is preferably made from a weave that includes at least one conductive strand for conducting a current along at least part of its longitudinal length. In other embodiments, the ring part may have an inner diameter (or an opening) that is larger than an outside diameter of the batteries. In other words, the opening of the ring part should be larger than the outside portions of the batteries such that the batteries can be inserted through the ring and into the inside of the body part. An object such as a cylinder, a rod, etc. may then be inserted within the ring part and locked into place such that it contacts an adjacent terminal of the batteries and holds the batteries in position.

Figure 12A:
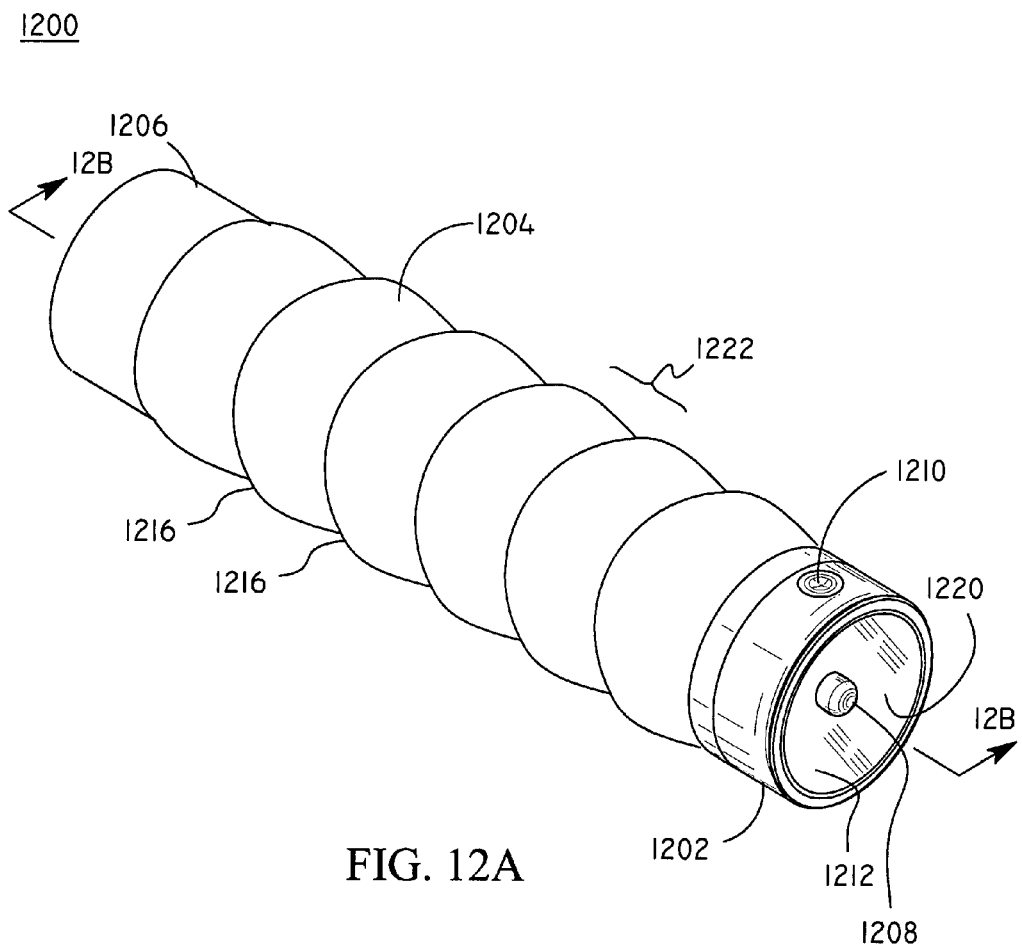
FIG. 12A is a perspective view illustration of a flashlight according to the present invention.

A perspective view illustration of the flashlight according to the present invention is shown in FIG. 12A. The flashlight 1200 includes a body part 1204 including a collapsible section that is made from a flexible polymer (e.g., plastic). The body part 1204 includes at least one opening for inserting one or more batteries (not shown), a tail part 1206, and a head part 1202. The head part 1202 includes an illumination source 1208 (such as an LED, etc.) for providing illumination. The flashlight 1200 includes an optional switch 1210 which can be located on the tail part 1206, the body part 1204 or the head part 1202 (as shown) and an optional lens 1212. The body part 1204 includes folds 1216 defining bellows 1222 that will be more clearly illustrated with respect to FIGS. 12B and 12C. An optional reflector 1220 provides reflective means of forming a desired beam of illumination. The reflector 1220 and or the illumination source (e.g., the LED) 1208 may be adjustable relative to each other so that the beam may be focused as desired. Although a description of the head and tail parts 1202 and 1206, respectively, will be given in this application, it should be understood that conventional head and/or tail parts may be used with the present invention. As described above, the batteries 124 may be placed within a cavity formed by the body part via an opening in the head and/or tail parts 1202 or 1206, respectively, or by removal of at least a part of the head and/or tail parts 1202 or 1206, respectively from the flashlight 1200. As shown, the tail part 1206 is formed integrally with the collapsible body part 1204. Accordingly, the head part includes a screw member for removing it from the body part 1204, or for removing its elements (e.g., the bulb reflector, lens, etc.) so that the one or more batteries may be inserted/removed from body part's 1204 cavity. Such removal means may include a ring that which is screwably attached to the head part 1202 and which holds one or more of the illumination source, reflector, etc., in place. As such removal means are known in the art, for the sake of clarity, a further description thereof will not be provided.

Figure 12B:
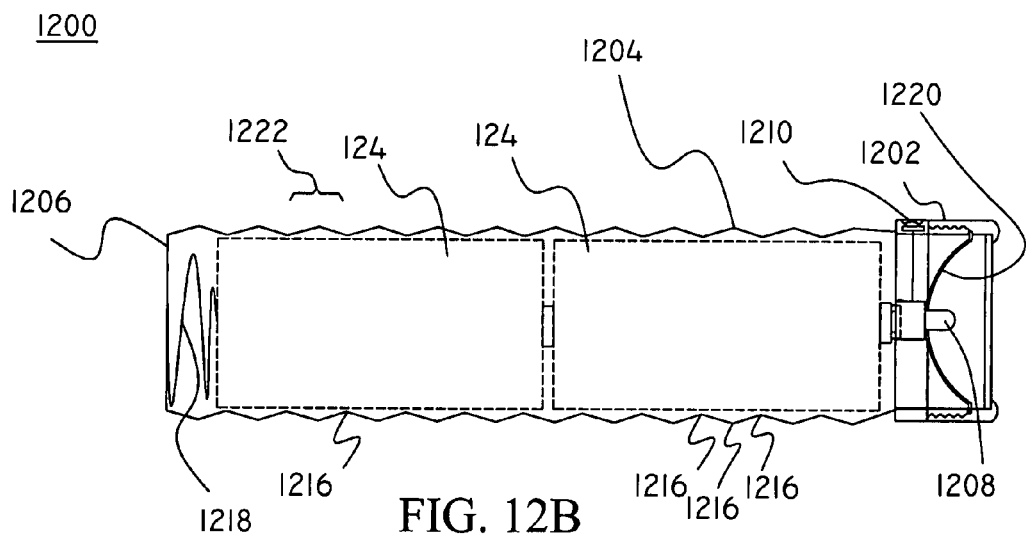
FIG. 12B is a cross section view illustration of the flashlight taken along line 12B-12B of FIG. 12A.

A cross section view illustration of the flashlight taken along line 12B-12B of FIG. 12A, is shown in FIG. 12B. For the sake of simplicity, FIG. 12B has not been cross hatched. The body part 1204 is optionally formed integrally with the tail part 1206, and includes a cavity for holding one or more batteries 124. The body part 1224 can fold at folds 1216 so that the body part 1224 can collapse upon itself. An optional biasing member (e.g., a spring) 1218 for contacting an adjacent terminal of the adjacent battery 124 forms at least part of a circuit for supplying power to the illumination source 1208. An optional switch 1210 is used to turn on the flashlight. In addition to providing a conventional on/off function, the switch 1210 may optionally include a controller, timers, etc., for periodically turning on/off (i.e., flashing) the flashlight 1200. Additionally, an optional voltage/current regulator may be included to regulate the voltage and/or current supplied to the illumination means 1208 such that the illumination source 1208 does not burn out. The switch may be included with the voltage/current regulator or may be placed in series or in parallel in the circuit, as desired. If formed from a non-conductive polymer, the body part may include a vapor deposited coating on at least one surface thereof such that it may conduct current along at least part of its longitudinal length. Alternatively, a flexible conductive tape, wire, etc., may be molded integrally with, or attached to, the body part 1204 so that it can conduct. Accordingly, a circuit including an optional switch 1210 and/or an optional voltage/power regulator controls illumination of the illumination source 1208. The conductive coating or element (not shown) is preferably located adjacent to an interior (and/or an exterior) surface of the body part 1204 and/or the tail part 1206 so that it can be coupled to the biasing means 1218.

Figure 12C:
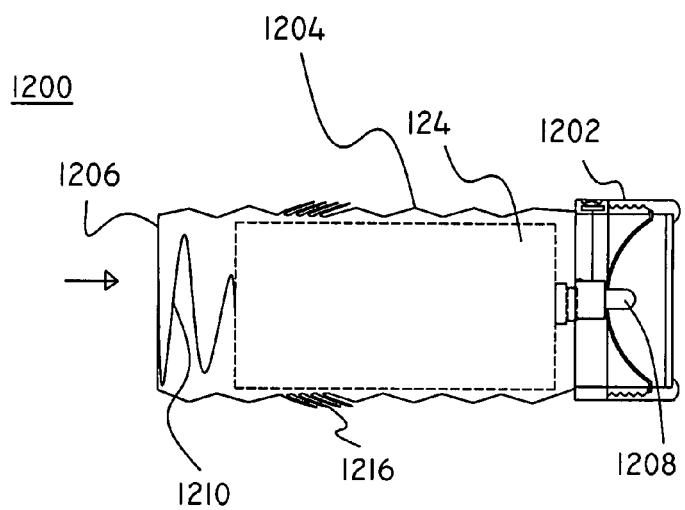
FIG. 12C is a cross section view illustration of the flashlight of FIG. 12B with a single battery cell.

A cross section view illustration of the flashlight of FIG. 12B with only a single battery cell is shown in FIG. 12C. For the sake of simplicity, similarly to FIG. 12B, FIG. 12C has not been cross hatched. As shown, the flashlight 1200 may include any number of a given size of battery cells, as desired. For example, the flashlight 1200 may be expanded to include 5 cells or may be compacted and include 1 cell. Moreover, the flashlight 1200 may be folded for shipping and/or storage and thus, taken very little space compared to typical 4 or 5 cell flashlights. Accordingly, the number of cells that the flashlight 1200 may include may be determined by adjusting the size and or number of bellows 1216 included with the body part 1204. A ring clamp (e.g., a screw clamp, a ring, an elastic band, etc.) may be positioned over the folded sections of the body part 1204 such that they are held against the battery 124 and do not open unexpectedly. An optional adjustment mechanism can also be included in either the head and/or tail parts of the present invention to adjust the biasing means (or other object which contacts a terminal of an adjacent battery) as will be described below.

Although not shown, the inside/outside diameters of the head and body part may be sized such that at least one of them may be placed within the other (e.g., the tail part placed within a cavity of the head part) when batteries are not present. Additionally, the body may be folded over itself to further compact the flashlight according to the present invention. Accordingly, the flashlight may be compacted which can minimize storage area.

A further advantage of the flashlight according to the present invention is that it is lightweight and is not subject to being bent or other wise damaged by shock or other impacts which would typically damage the bodies of typical rigid flashlights. This can be of critical importance, when for example, a bent barrel of a typical flashlight would prevent the removal/insertion of batteries.

As shown the body part 1204 can contract and/or expand in diameter to firmly hold one or more batteries contained therein. The biasing member provides a biasing force upon the body part so that the electrical contact can be maintained between the terminals of the one or more batteries contained therein and the flashlights circuitry. The head part is similar to the head part shown in FIG. 1.

It should be noted that the present invention is not drawn only for the specific use of the head and/or tail parts shown and described in this application. Other head and/or tail parts may be used with the present invention. For example, conventional head and/or tail parts may be used. For example, a Mini-Mag™ (Manufactured by the Mag Instrument Co., Ontario, Canada) flashlight head, tail and/or barrel parts may be used with the present invention. For example, if it is desired to use the woven body of the present invention with a head part (i.e., assembly, of the well known Mini-Mag™ flashlight, then woven body part of the present invention can be attached to a part of the barrel assembly of the Mini-Mag™ flashlight. Accordingly, the head assembly (of the Mini-Mag™ flashlight) would then be attached as usual to at least a part of the corresponding barrel assembly. It is also envisioned that conventional tail parts (i.e., tail assemblies) of conventional flashlights or components thereof can also be used with the present invention. Moreover, conventional flashlight components such as circuit components which, for example, may include switches, bulbs, lamp holders, etc., may also be used, and for the sake of clarity, a further description thereof will not be given.

In alternative embodiments, an advertising means in which the size and/or aspect ratio (i.e., the ratio of height to width) of a text (e.g., names, etc.) graphics (e.g., logos, etc.), etc. formed on the body portion can change as the body portion (part) is expanded and/or contracted. Accordingly, depending upon the size of the one or more batteries contained within the body part, the body part will expand/contract in, for example, diameter/length which would change the aspect ratio of the text and/or graphics. It is also envisioned that the text and/or graphics may be formed by controlling a surface opacity of the strands. For example, if the strands of the present invention are coated with a vapor deposited layer (e.g., aluminum), the coating can be placed so as to form text and/or graphics. Accordingly, if the strands also conduct light, then the text and/or graphics may be lit up by illuminating the light conducting strands. Alternatively, the background of the text and/or graphics may be lit up, thus providing a novel effect.

Suitable materials for construction of the flashlight can include metals, polymers, etc. For example, the flexible body part may be made from metallic materials, polymers, glass fibers, etc., as desired. If made from a metallic material (e.g., brass, copper, aluminum, silver, gold, etc.), the flexible body portion would be conductive and would be capable of transferring power along its longitudinal length. However, if the flexible body portion were made from a non-conductive material (e.g., some polymers, glass fibers, etc.), conductive stands (e.g., metallic strands), etc. may be woven into (or otherwise attached to) the body portion so that electrical power can be conducted along the length of the body portion using this added material. In yet other alternative embodiments a wire or other type of conductive lead may extend across at least a portion of the flexible body part so that an electrical circuit to supply power (e.g., to the bulb, LED, leads, etc.), may be established. Moreover, if made from a polymeric material, the polymers may be made from a glow-in-the-dark material such that the flashlight can be readily found in the dark. The polymers may also be coated with a vapor deposited metal (e.g., aluminum) such that they are conductive.

It should be appreciated that the different parts of the present invention may be mixed and matched with each other to form a desired type of flashlight. Additionally, a coupling device may be used with, for example, the body part of the present invention, such that electrical power may be provided to other mobile devices, as required. The coupling part can replace the head part or work with the head part of the present invention. Further, the coupling part may be coupled to several body parts (e.g., woven body parts according to the present invention) that are attached to the coupling part in parallel or series so as to provide a desired voltage/current. Accordingly, the battery pack according to the present invention may contain one or more battery cells. The coupling means may include its own voltage/current regulator so that a desired voltage/current can be provided. The voltage/current regulator may be preset, automatically set by a controller, and/or set by user, as desired. When used as a battery pack, a switch may not be necessary.

Thus, due to the compact size of the present invention, it may be easily carried with other mobile devices. For example, the body part (and/or other parts of the present invention) may be folded and carried, for example, in a compartment of a mobile device (e.g., PALM™, a PDA, a cell phone, an MP-x (e.g., MP3, MP4, etc.) type player, imaging devices such as cameras, thermoelectric (TE) devices such as sensors and/or heat transfer devices, liquid crystal devices, piezo-electric devices, transducers, controllers, photovoltaic devices, etc.) and used to provide power to these mobile devices when their own batteries run low, etc.

In alternative embodiments, the polymers from which the weave of the body portion is woven may include one or more light conducting strands (or be entirely composed of light conducting strands). Accordingly, the ends of these light conducting strands may be coupled (e.g., directly or using an optical ring, etc.) to a light source (e.g., an LED, a Laser LED, etc.). Therefore, illumination provided by the light source may be emitted by the light conducting strands. Thus, a novel effect can be provided. Additionally, a controller and one or more illumination sources may be provided such that different colors of light may be produced at, for example, different times to cause the body part of the flashlight to glow with different hues, thus providing a further novel effect. The illumination sources (or source) used to illuminate the body part may be the same as the illumination sources shown in the figures of the present invention or may be different from them. One or more switches (or switching means) may be provided to control these illumination sources. For example, with reference to FIG. 11, the ring 1106 may include one or more Laser LEDs optically coupled to the body part 1104 so that light emitted from the LEDs would be coupled to the strands of the body part, which would, of course, be formed at least in part from an optically conductive material. The LEDs in the ring 1106 may be powered using the battery 124 or may be powered using their own power source (e.g., miniature battery cells included in the ring). An optional switch to turn on/off the LEDs included in the ring 1106 may also be provided, as desired.

A cross section view of the flashlight including partial barrels according to the present invention is shown in FIG. 13. The flashlight 1300 includes a head part 1302, a body part 1304 and a tail part 1306. As shown, it is assumed that parts of each of the head, body, and tail parts 1302, 1304, and 1306, respectively, are formed using a conductive material. The body part 1304 is attached to both the head part 1302 and the body part 1304 using any suitable means (e.g., molds, clamps, rings, adhesives, etc., as desired). As shown, the body part 1304 may be attached to the tail and head parts 1302 and 1306, respectively, using rings 1308 (e.g., which can include pressure-fit rings, adjustable clamps, etc., as desired). Each of the tail and head parts 1302 and 1306, respectively, includes a corresponding main section 1310 and 1312, respectively. The tail part 1306 may include a cap 1314 which may be screwably attached thereto, a biasing means (e.g., a spring, etc.) 1316 and a switch 1318. When switched on (i.e., turned on), the switch 1318 completes an electrical circuit from the biasing means to the body part 1304 via the cap 1314 and the main section 1312 (if the cap and main section are conductive). However, separate circuit means may be included so that the circuit from the switch to the body part does not have to use the cap and main section, which would be beneficial if the cap and main section were made from a non-conductive material such as plastic (which may for example lack a conductive surface). Optional "O-rings" 1334 may be used to provide waterproofing and a desired amount of friction. The switch 1318 may be tuned on/off by pressing an optional flexible membrane 1318M that protects the switch. The head part 1302 includes the main section 1310 and an optional lens/reflector section 1320 (that can be fixedly attached to the main section, if, for example, variable focusing is not desired). The lens/reflector section 1320 includes a lens 1324, and a reflector 1326 and is screwably attached to the main section 1310 using threads 1322 such that the lens/reflector section 1320 can be moved along a longitudinal axis of the flashlight relative to the main section 1310. Accordingly, the reflector 1326 can variably focus light being provided by a bulb 1328. The bulb 1328 is held by an optional positioner 1330 that is screwably attached to the main section 1310. An optional locator 1336 is screwably attached to the positioner 1330 and uses compressive fit to hold the bulb 1328 in position. Many of the components of flashlight 1300 are similar to conventional flashlights, such as one manufactured by the Garity Corporation, and, for the sake of clarity, a further description, will not be given.

A perspective view illustration of a battery pack according to the present invention is shown in FIG. 14A. The battery pack 1400 includes a head 1402, a tail 1406 and a body 1404 joining the head and tail parts 1402 and 1406, respectively. The body part 1404 is either fixedly or releasably attached to either or both of the head and tail parts 1402 and 1406, respectively, as described elsewhere in this application (with respect to flashlights, etc.). The head part includes a connector such as a cord 1408 for outputting power to a desired device such as a mobile telephone 1410. The connector 1408 includes an adapter 1412 that is adapted to fit a port or attachment point on the attached mobile device and provide power thereto and, for the sake of clarity, a further description will not be given. A switch and/or voltage/current regulating means (not shown) may also be provided to supply the proper voltage/current and desired times to the attached device.

The head and/or tail parts 1402 and 1406 may be similar to the head and/or tail parts of flashlights shown and described in the present application, and for the sake of clarity, a further description will not be given. However, if desired, the head and/or tail parts can be designed specifically for a battery pack (in which case, for example, the head and/or tail parts can include circuitry for charging a battery contained therein) and elements such as reflectors, bulbs, lenses (and associated elements), which are required for a flashlight, may be absent or removed.

For example, a detailed cross section view illustration of a battery pack including a head part that is similar to the main section of FIG. 14A is shown in FIG. 14B. The lens/reflector section and bulb are removed from the flashlight shown in FIG. 13, and a connector 1408B is attached to a head part 1402B in a similar fashion to form a battery pack that is similar to that shown in FIG. 14A. The connector 1408 includes one or more wire leads for conducting current to and/or from the battery pack. The connector 1408 may be connected to the head part using, for example, a friction fit, a compressive fit, screw means, latch means, etc., so that one or more components of the connector may be attached to the head part as desired. Likewise, the connector 1408 may be formed from one or more components which can be assembled together using a friction fit, a compressive fit, screw means, latch means, etc., so that a user can easily assemble the connector and/or battery pack. For example, the connector 1408 may include a connector 1408B part that can be inserted into a jack part 1408C of connector 1408. In alternative embodiments, the connector may be directly attached to the body part. Further, a flexible cord is optional.

Figure 15:
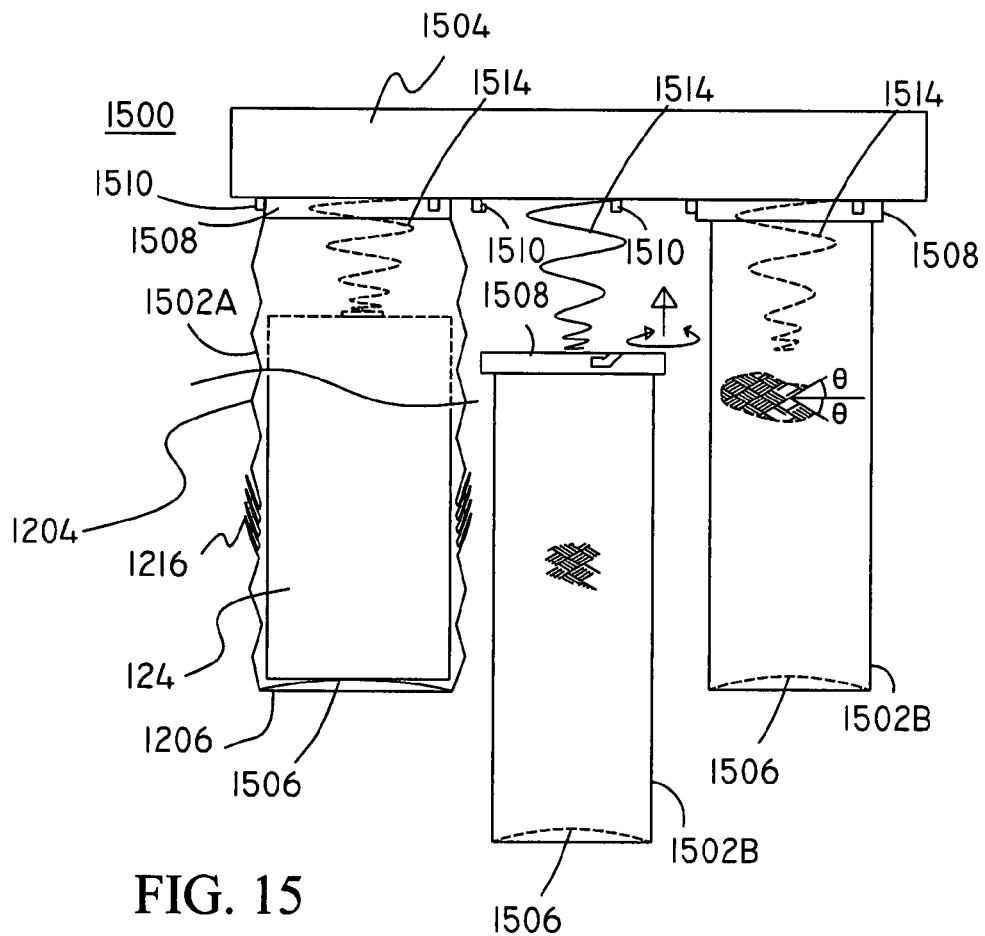
FIG. 15 is a partial cutaway side view illustration of a battery pack including several flexible weaves for holding the batteries in parallel with each other according to the present invention.

A partial cutaway side view illustration of a battery pack including several flexible weaves for holding the batteries in parallel with each other according to the present invention is shown in FIG. 15. The battery pack 1500 includes one or more battery holders 1502A and 1502B which are similar to the body parts or portions as described elsewhere in this invention and have an interior portion for holding one or more batteries.

As shown, holder 1502B includes a weave which is similar to the body part 110 as described elsewhere in this invention, and holder 1502A includes a folding-type element which is similar to body part 1204 as described elsewhere in this invention. Although different types of battery holders 1502A and 1502B are shown, the battery pack may be formed using similar or different types of holders. The battery holders may be attached to a main part 1504 (e.g., for charging/discharging) using any suitable means. For example, the battery holders 1502 may be mounted using adhesives, bonds, a friction fits, etc. In the preferred embodiment, a ring 1508 is mounted to an end of each of the battery holders 1502. The rings are preferably conductive and may be releasably attached to the main part 1504 using any suitable means such as a screw fit, a friction fit, a latch fit, a magnetic fit, etc. For example, the ring may include a latch area 1510 that engages a prong 1511 on the main part 1504. The ring 1508 has an opening for inserting batteries into a cavity of the holders. Conductive end parts 1506 are located at an end of the holders and couple an adjacent terminal of a battery contained within a respective holder to the holder (e.g., to the weave). Optional springs 1514 provide a biasing force for maintaining contact to a terminal of a battery contained within a respective holder such that a circuit can be established to charge/discharge the battery. As shown, the springs 1514 are mounted to the main part 1504. However, one or more of the springs 1514 may also be mounted at an opposite end of the holders 1502. For example, conductive end parts 1506 may include a spring 1514. The main part 1504 may include proper circuitry for charging/discharging the batteries attached thereto. For example, such circuitry can include a 110/220V wall plug for receiving AC power, an adapter for receiving/transmitting power to a mobile device (e.g., a cellular telephone, a PDA, etc.), a 12 plug for receiving/transmitting power to an automobile-type 12V adapter, etc., as desired. Accordingly, circuitry for receiving/transmitting power such as a voltage regulator, switches, etc., may be included in the battery pack of the present invention. However, as this circuitry is well known in the art, for the sake of clarity, a further description thereof will not be given.

Figure 16:
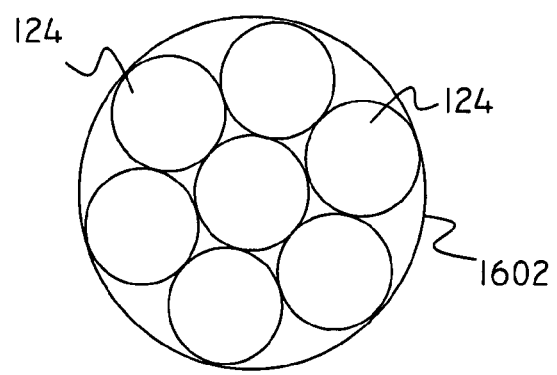
FIG. 16 is a side view illustration of a plurality of serially placed batteries in a flexible battery holder according to the present invention.

A side view illustration of a plurality of parallel placed batteries in a flexible battery holder according to the present invention, is shown in FIG. 16. A flexible battery holder (which is similar to the flexible weaves described elsewhere in this application) 1602 includes an opening in which the batteries 124 are located in parallel. One or more rings (not shown) may be placed adjacent to the ends of the batteries such that the voltage and/or current of the batteries may be combined as desired. Accordingly, the ring may either include a single conductive element or may include an insulator part and contacts which are formed so as to conduct current to/from the batteries to increase the voltage, if desired. Accordingly, the ring may be attached to an end part (not shown) using a conductive lead or may be attached using a biasing means which may itself conduct electricity.

The battery pack according to the present invention may include a charger for receiving power from another device (e.g., alternating current from an AC device—such as a wall plug), a direct current (DC) device—such as a car charger, and for charging batteries contained in the battery pack. The charger may include a converter such as a regulator for regulating power provided to/from the batteries as is conventionally known in the art. As converters are well known in the art, for the sake of clarity they will not be discussed in detail.

Figure 17A:
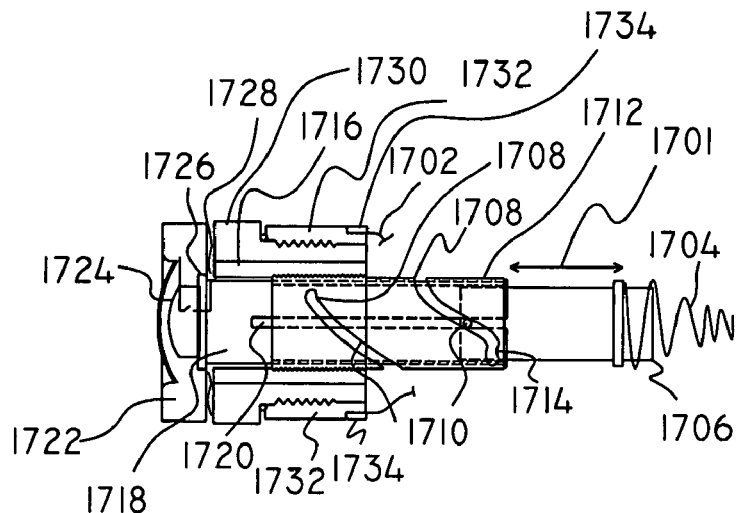
FIG. 17A is a partial cutaway view illustration of a tail part including adjustment means according to the present invention.

A partial cutaway view illustration of a tail part including adjustment means according to the present invention is shown in FIG. 17A. The tail part 1700 is similar to the tail part shown and described with reference to FIG. 13. However, an adjustment mechanism (such as a telescoping mechanism) is included to snug an optional biasing member 1704 against an adjacent battery contact terminal (not shown). The optional biasing member 1704 is held in position by a first cylinder (i.e., a telescoping element) 1706 having protrusions 1710 suitable for engaging a cam (i.e., a splined section) 1708 extending radially across the diameter of the first cylinder 1706. The cam 1708 is part of a second cylinder 1712 which encloses at least part of the first cylinder 1706. The second cylinder 1712 may also include detents 1714 positioned as part of the cam 1708 for holding the protrusions 1710 and thus, the first cylinder 1706 in a desired position. The second cylinder 1712 is preferably screwably attached to and held in position by an optional isolation ring 1716. A third cylinder 1718 is at least in part sandwiched between the first and second cylinders 1706 and 1712, respectively, and includes notches 1720 for engaging the protrusions 1710 such that when the third cylinder 1718 is rotated in a direction that is radial to the longitudinal axis of the tail part 1700, the notches 1720 engaging the protrusions 1710 cause the protrusions 1710 (and thus the first cylinder 1706) to rotate correspondingly. Accordingly, the protrusions 1710 are moved in the longitudinal direction (i.e., telescopes, as indicated by arrow 1701) by the cam 1708. The third cylinder 1718 is attached to an end cap 1722 using any suitable means (e.g., threads, adhesives, pressure bonding, friction fitting, etc., as desired). The end cap 1722 includes an optional switch 1724 for completing a circuit as described elsewhere in this application. When including the optional switch 1724 in the end cap 1722 it is desirable to electrically insulate the third cylinder 1718 from a the body of the end cap 1722 so that an electrical current would have to pass through the switch 1724 before entering the body of the end cap 1722. Accordingly, an insulator 1726 is placed between the end cap 1722 and the third cylinder 1718 for providing the desired electrical insulation. When switch 1724 is "on," an electrical current is passed via an optional conductive means, such as optional spring washer 1728, to an optional outer ring 1730 that is screwably attached to an attachment ring 1732 which is attached to a body part 1702 for holding one or more batteries, as discussed elsewhere in this application. The body part 1702 is attached to the attachment ring 1732 using, for example, a clamping means 1734 which can include a compressive ring, a spring clamp, an adjustable clamp, etc. Accordingly, it is preferred that the biasing means 1704, the first through third cylinders 1706, 1712, and 1718, respectively, the body of the end cap 1722, the spring washer 1728, the outer ring 1730, and the attachment ring 1732 are conductive so that a current can be passed from battery terminal to the body part 1702 via the optional switch 1724 when the switch is turned on. An optional voltage/current regulating means (not shown) may also be included for regulating at least one of the voltages and/or currents, as desired. A locking member such as a detent on the spline (as shown) or ratcheting members, notches, friction fits, cam lobes, etc., on for example, rotating members or on the telescoping member, etc., may be used to lock the telescoping element in a desired position. For example, a ratcheting mechanism, tooth and notch mechanism, etc., may be used to restrict the rotation of the end cap 1722 when in a locked position.

Figure 17B:
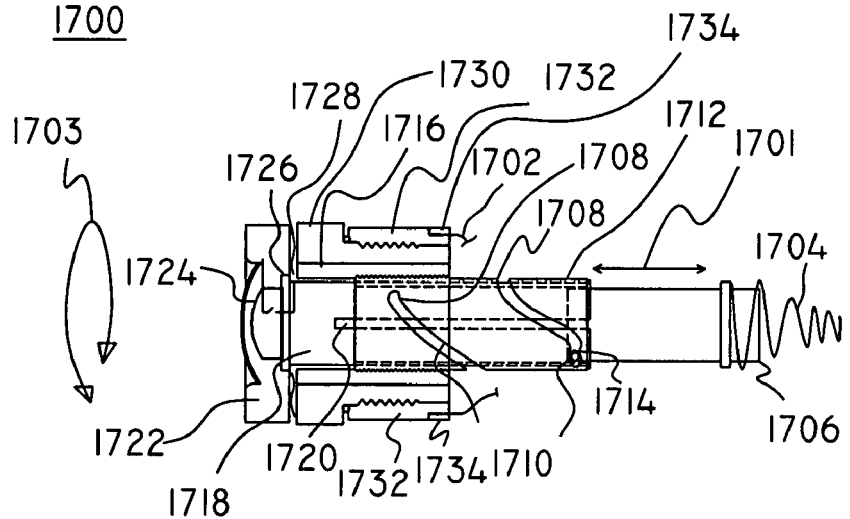
FIG. 17B is a partial cutaway view illustration of the tail part shown in FIG. 17A in an extended position.

A partial cutaway view illustration of the tail part including adjustment means according to the present invention shown in FIG. 17A, is shown in FIG. 17B. As shown, when the third cylinder 1718 is rotated as shown by arrow 1703 in a direction that is radial to the longitudinal axis of the tail part 1700, the first cylinder moves along the longitudinal axis of the tail part 1700 as shown by the arrow 1701.

Figure 18A:
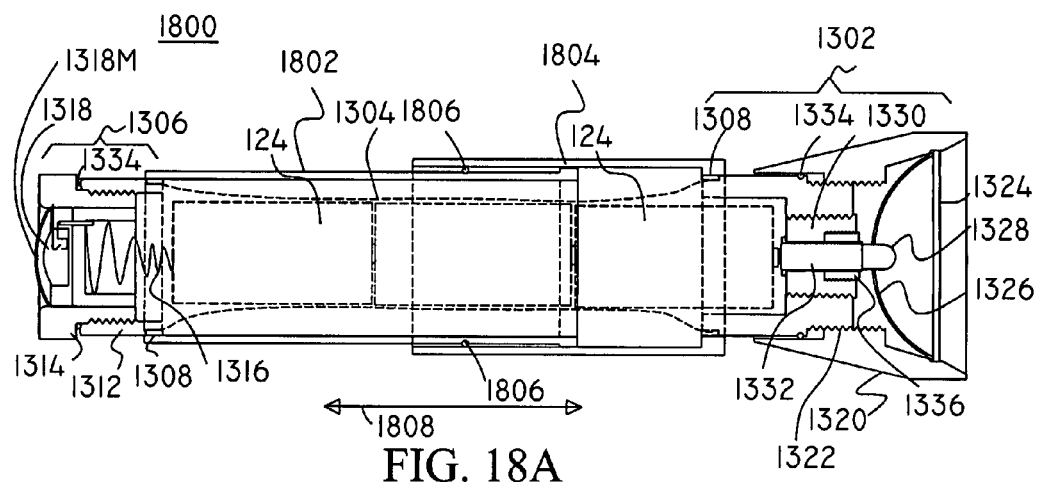
FIG. 18A is a partial cutaway side view illustration of a flashlight including an adjustable solid barrel.

A partial cutaway side view illustration of a flashlight including an adjustable solid barrel is shown in FIG. 18A. The flashlight 1800 is similar to the flashlight shown in FIG. 13 with a difference being the inclusion of a first barrel part 1802 that slidably engages a second barrel part 1804 such that the first barrel part 1802 can slide into a cavity of the second barrel part 1804 (or vice versa). An optional biasing member (e.g., a spring, a screwable ring, a clamp, etc.—not shown) may be used to provide a biasing force causing the first and second barrel parts 1802 and 1804 to move away from each other in the direction of arrow 1808. Accordingly, if the barrel parts are attached to head and tail parts 1302 and 1306, respectively, a tensile force is imposed across the ends of the body part 1304 which causes the body part 1304 to contract about (i.e., by decreasing its diameter) and position one or more batteries contained therein. It is also envisioned that a locking mechanism (not shown), may be used to "lock" the barrels in place once they are placed in a proper position relative to each other. Such locks may include notches, screw operated cam mechanisms (such as are typically used in plumbing), etc., as is known in the art. For example, a ring (not shown) may be screwably attached to, for example, an exterior portion of the first barrel part 1802 via threads (not shown) on the exterior surface of the first barrel part 1802. This ring can then be moved such that so that a portion of it contacts the second barrel part 1804 to urge it to slide away from the first barrel part 1802. Likewise, the first and second barrel parts may be screwably attached to each other so that there length may be adjusted. As shown, the first and second barrel parts are shown attached to the head and tail parts. However, the barrel parts may be formed integrally with the head and tail parts if desired. Further, one of more "O" rings may be used to seal the interior portions of the barrel parts. Further, similar "O" rings may be placed between the head and tail parts, if desired. A benefit of the present invention is that one or more barrel parts and/or head and tail parts may be stacked within and about each other so that overall size may be reduced in a folded state. Further, various batteries types or different numbers of batteries may be used, as desired. The barrel parts of the present application may be used with conventional head and/or tail parts, as desired.

It is also envisioned that at least one of the barrel parts may be connected to a battery charger or another mobile device to receive/transmit power. For example, the second barrel part may be connected to a ring part for inserting into a battery charger or to a connector part (e.g., via a ring part or directly) so that the barrel parts may be connected to a mobile device (e.g. a cell phone, etc) for supplying power to the mobile device. The weave may then be connected to an adjacent end of the barrel part or may be connected to the ring or connector part, as desired.

Figure 18B:
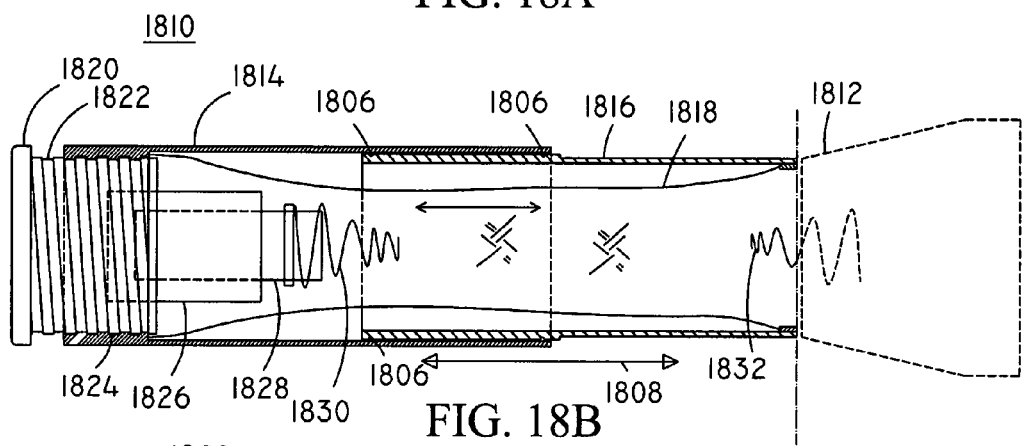
FIG. 18B is a partial cutaway side view illustration of an alternative embodiment of the flashlight shown in FIG. 18A.

A partial cutaway side view illustration of an alternative embodiment of the flashlight shown in FIG. 18A, is shown in FIG. 18B. Flashlight 1810 is similar to the embodiment shown in FIG. 18A and includes a head part 1812, one or more telescoping barrel parts such as first and second barrel parts 1816 and 1814, respectively, a woven body part 1818, and a tail part 1820. The head part 1812 may include any suitable head or a connection mechanism for connecting the flashlight to, for example, another device such as, cellular phones, radios, chargers, etc., as desired. An optional biasing member 1832 may be connected to the head part 1812. The first and second telescoping barrel parts 1816 and 1814, respectively, are slideably located relative to each other. The woven body part 1818 has first and second ends which are respectively attached to the first and second barrel parts 1816 and 1814 so that the length of the woven body part 1818 may be adjusted by sliding the first and second barrel parts 1816 and 1814 relative to each other. However, in alternative embodiments, the length of the woven body part may be adjusted independently of the barrel parts. The tail part 1820 is optionally removably attached to the second body part 1814 using, for example, threads 1822 or other suitable means. A switch (not shown) may be connected to one or more of the head, barrel or tail parts, as desired.

As shown, the tail part 1820 can be slidably located relative to the second barrel part 1814 using, for example, the threads 1822 which engage corresponding threads 1824 of the second barrel part 1814. The tail part 1820 includes an optional length adjustment mechanism for adjusting its length to correspond with the number and type of batteries contained within the body part 1818. Any suitable length adjusting mechanism may be used. For example, the adjusting mechanism shown in FIGS. 17A-17B may be used. As shown, the optional length adjusting mechanism of the tail part 1820 includes one or more telescoping members (1826, 1828), such as, first and second telescoping members 1826 and 1828, respectively. The telescoping members may be locked into position using any suitable locking mechanism. For example, a notch and spline, a friction fit, a clamp, etc., may be used. As shown, the tail part 1820 includes an optional biasing member 1830 attached to the second telescoping member 1828 for contact with an adjacent battery terminal. However, in alternative embodiments, one or more of the telescoping members or a main portion of the tail part may contact the adjacent battery terminal. Further, one or more of the telescoping members may be biased by a spring into an extended position, as desired. The flashlight 1810 may also include a locking mechanism for locking the first and second barrel parts 1816 and 1814, respectively, in position relative to each other. Suitable locking mechanisms may includes clamps, threads, friction fits, etc., as desired. Optional gaskets 1806 may be used to seal the barrel from outside elements. Likewise, one or more optional gaskets (e.g., an O-ring—not shown) may be placed between barrels and adjacent head and/or tail parts so as to seal the cavity contained within the flashlight 1810 from the elements.

Further, a conductive element may be used to electrically connect the first and second barrel parts to each other. In the preferred embodiment, electrical power is transferred to the head part via, for example, a circuit which includes the contact 1830, the first and second telescoping members 1826 and 1828, respectively, the tail part 1820, and the first and second barrel parts 1816 and 1818, respectively. The head part includes an illumination source and switch for controlling the illumination source.

A slip ring may be used to connect one or more ends of the body part to a respective barrel part such that one or more of the barrel parts may be slidably located or rotated relative to each other and/or the body part. Further, it is also envisioned that the tail part may be formed integrally with the second barrel part.

Figure 19:
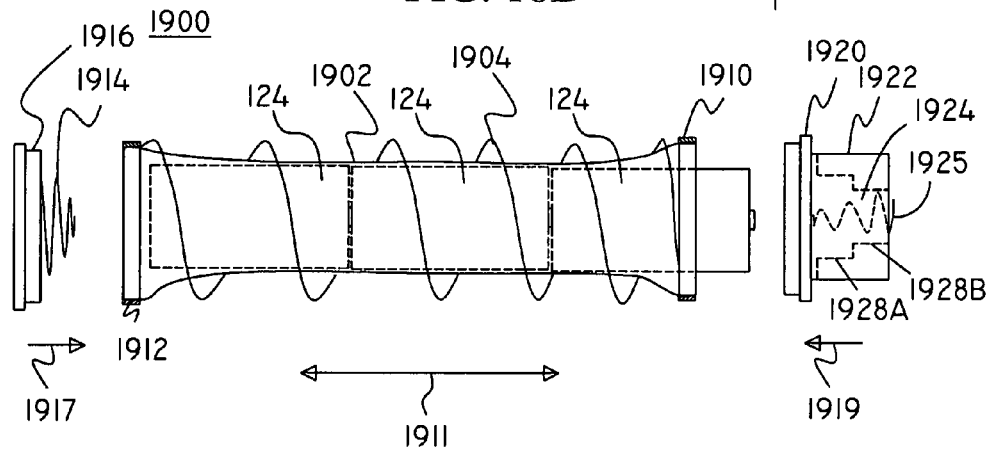
FIG. 19 is a side view illustration of battery carrier according to the present invention.

A side view illustration of battery carrier according to the present invention is shown in FIG. 19. The battery carrier 1900 includes a woven body 1902 which is optionally "tensioned" using a biasing member such as a spring 1904. The spring 1904 provides a tensile force to, for example, first and second rings 1906 and 1908 that are respectively attached to first and second ends 1910 and 1912, respectively, of the body 1902. Accordingly, when batteries 124 are placed within the cavity of the body 1902 and the first and second ends 1910 and 1912 move in opposite directions from each other, the body 1902 shrinks around the batteries 124 to firmly hold the batteries 124 in place. Thus, the body 1902 automatically conforms to the diameter of one or more inserted batteries 124. Optional end parts 1916 and 1920, respectively, connect (e.g., releasably—using a latch means, etc.) to the respective first and second rings 1910 and 1912. The optional end parts 1916 and 1920 may include contact parts such as biasing members such as springs 1914 and 1924 which provide a biasing force against adjacent battery terminals and provide a path for electrical contact. For example, spring contact 1914 couples the adjacent battery terminal to the end part 1916 which is itself coupled to the body part 1902 and/or to other elements, e.g., switches, barrels, etc. Optional steps, 1928A and 1928B are used to optionally position various battery types according to diameter and therefore type. Accordingly, for example, a AA-type battery would fit into the area having the smallest opening, while, a D-type battery would be prevented from fitting into this area, as desired. Contact 1924 couples an adjacent battery terminal to desired circuitry such as lead 1925 for providing power to a desired component such as a (e.g., a bulb, a switch, etc.), as desired. In other embodiments, contact 1924 can include a bulb, a bulb contact, a non-biasing contact, etc. which is coupled to an adjacent battery terminal. The end parts are optionally conductive such that they may conduct power. However, if desired, the end parts may be formed from an insulator. For example, as shown, end part 1920 is preferably formed from an insulator. Although not shown, insulators may be provided to isolate conductive elements, etc.

It is also envisioned that the first and second ends of the body 1902 may be attached to first and second barrel parts (e.g., 1902 and 1904) that are slidably attached to each other as shown in FIG. 18, in which case a biasing means and/or a locking assembly may be used to either bias or lock the first and second cylinders in place. In use, the battery carrier of the present invention may be placed within a conventional flashlight body (or one that is designed to accommodate the battery carrier of the present invention) and provide a novel means for adjusting to a wide variety of battery types and numbers which can be of critical importance especially during emergencies. Furthermore, the battery carrier of the present invention may be inserted into other devices, such as the battery charger of the present invention and/or inserted within the battery compartments of conventional mobile devices to provide power to these devices. Accordingly, a user can substitute, for example, a smaller battery for a larger battery.

Certain additional advantages and features of this invention may be apparent to those skilled in the art upon studying the disclosure, or may be experienced by persons employing the novel structure of the present flashlight, chief of which is that it provides the ability to use different types and numbers of cells in a flashlight. Additionally, it minimizes the space required to store a flashlight. Other advantages include lighter weight, lower cost, and a reduction in the individual components for manufacture. Additionally, a novel advertising means is provided. Additionally, a multi-cell flashlight that may packaged within an envelope and mailed using standard mailing techniques is be provided.

Further, the present invention may be used with batteries having various shapes and sizes. For example, a typical 9V battery may be used with the present application if a suitable terminal connector is used. Moreover, various batteries such as common Lithium (Li) ion batteries may be used with suitable connector terminals.

Additionally, the body part of the present application may be folded over itself and inserted into the cavity of the body part. Accordingly, a small trap can be created to trap, for example, fish.

While the invention has been described with a limited number of embodiments, it will be appreciated that changes may be made without departing from the scope of the original claimed invention, and it is intended that all matter contained in the foregoing specification and drawings be taken as illustrative and not in an exclusive sense.

What is claimed is:

1. A woven receptacle for a power source, comprising:
   a body portion formed from woven material, the body portion defining at least part of an adjustable cavity for containing at least one power source; and
   a head portion structured and arranged to be secured to the body portion, wherein a radius or an area which is normal to a longitudinal length of the body portion can be adjusted so as to form the adjustable cavity for containing the at least one power source.

2. The apparatus of claim 1, wherein the head portion is structured to receive an illumination source which provides illumination.

3. The apparatus of claim 1, wherein the body portion comprises at least two strands defining an angle at a point where they intersect with each other, the angle changing when the adjustable cavity of the body portion is adjusted.

4. The apparatus of claim 1, further comprising a tail portion structured and arranged to be connected to at least one of the body portion and an adjacent terminal of the at least one power source.

5. The apparatus of claim 2, further comprising a converter for controlling power supplied to the illumination source or the at least one power source.

6. The apparatus of claim 1, wherein when the diameter or the area of the adjustable cavity, at a point that is located along the longitudinal length of the body portion, is adjusted, the length of corresponding parts of the body portion is adjusted proportionally thereto.

7. The apparatus of claim 1, further comprising at least one of a graphics and text formed on the body portion, wherein when the length of at least a portion of the body portion is adjusted, an aspect ratio defined by the height and width of the at least one of the graphics and text also adjusts.

8. The apparatus of claim 1, wherein the at least one power source comprises a battery, a fuel cell, or a capacitor.

9. A woven receptacle for a power source, comprising:
   a body portion formed from woven material, the body portion defining at least part of an adjustable cavity for containing at least one power source; and
   a head portion structured and arranged to be secured to the body portion, wherein the woven material includes at least one of electrically conductive strands and optically conductive strands, the electrically conductive strands conducting a current along a longitudinal length of the body portion.

10. The apparatus of claim 2, wherein the illumination means comprises at least one of a light emitting diode (LED), an organic LED (OLED), a laser LED, an incandescent bulb, a fluorescent bulb, and an electroluminescent (EL) device.

11. The apparatus of claim 5, wherein the at least one power source comprises at least one of a battery, a capacitor, and a fuel cell.

12. The apparatus of claim 1, wherein the head portion comprises a polymeric material having at least one weakened area.

13. The apparatus a claim 1, further comprising one or more cylinders structured and arranged to cover at least part of the body portion.

14. The apparatus of claim 1, further comprising a connector structured and arranged to couple the power source to one or more of a mobile station (MS) a cellular phone, a personal digital assistant (PDA), a PALM™-type device, an MP-x player, an imaging device, a global positioning system (GPS) device, a messaging device, a battery charger, a vehicle, a data and/or target acquisition device, a scope, a night vision device, a beacon, a strobe, a thermoelectric (TE) device, a liquid crystal device, a piezo-electric device, a transducer, a controller, and a photovoltaic device.

15. A method for adjusting a receptacle for one or more power sources, the method comprising:
   forming at least part of an adjustable cavity in a body formed from woven material, the cavity for receiving at least pan of one or more power sources;
   inserting at least part of the one or more power sources in the cavity;
   adjusting at least one of diameter and length of the cavity to conform to the one or more power sources; and
   supplying power to or from the one or more power sources.

16. The method of claim 15, further comprising supplying illumination using an illumination source wherein the one or more power sources comprise batteries.

17. A flexible receptacle for a power source, comprising:
   a collapsible body portion having one or more weakened lines defining one or more folds, and defining at least part of an adjustable cavity for containing at least part of one or more power sources, the cavity being adjusted in length by folding parts of the collapsible body portion at a corresponding fold of the one or more folds;
   a head portion structured and arranged to be secured to the body portion; and
   a tail portion structured and arranged to be secured to the body portion opposite the head portion such that when the body portion is folded, the distance between the head and tail portions changes accordingly thereto.

18. The apparatus of claim 17, wherein the head portion is structured and arranged to receive an illumination source and the one or more power sources comprise batteries.

* * * * *